US012726973B2

(12) United States Patent
Song et al.

(10) Patent No.: US 12,726,973 B2
(45) Date of Patent: Sep. 1, 2026

(54) ELECTRONIC DEVICE AND METHOD FOR PROVIDING SCHEDULING INFORMATION BASED ON LEARNING IN WIRELESS COMMUNICATION SYSTEM

(71) Applicant: SAMSUNG ELECTRONICS CO., LTD., Suwon-si (KR)

(72) Inventors: Juhwan Song, Suwon-si (KR); Sungjin Shin, Suwon-si (KR); Yujin Nam, Suwon-si (KR); Seowoo Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 802 days.

(21) Appl. No.: 17/963,634

(22) Filed: Oct. 11, 2022

(65) Prior Publication Data

US 2023/0114492 A1 Apr. 13, 2023

Related U.S. Application Data

(63) Continuation of application No. PCT/KR2022/013700, filed on Sep. 14, 2022.

(30) Foreign Application Priority Data

Oct. 12, 2021 (KR) ........................ 10-2021-0135017

(51) Int. Cl.
*H04W 72/1263* (2023.01)
*H04L 1/00* (2006.01)

(52) U.S. Cl.
CPC ....... *H04W 72/1263* (2013.01); *H04L 1/0003* (2013.01)

(58) Field of Classification Search
CPC . H04W 72/1263; H04W 24/02; H04W 72/12; H04W 72/541; H04W 72/20;
(Continued)

(56) References Cited

U.S. PATENT DOCUMENTS 9,839,005 B2 * 12/2017 Catovic ................. H04W 72/02
11,071,122 B2 * 7/2021 Calabrese ............ H04W 72/04
(Continued)

FOREIGN PATENT DOCUMENTS

CN 101820684 A 9/2010
CN 105873226 A 8/2016
(Continued)

OTHER PUBLICATIONS

3GPP; TSG RAN; E-Utra and NR; Study on enhancement for Data Collection for NR and EN-DC (Release 17). 3GPP TR 37.817 V0.3.0.Sep. 23, 2021, 18 pages total.
(Continued)

*Primary Examiner* — Ayaz R Sheikh
(74) *Attorney, Agent, or Firm* — Sughrue Mion, PLLC

(57) ABSTRACT

An electronic device may include a storage device and at least one processor, wherein the at least one processor may obtain environmental information from a radio access network (RAN) to store the environmental information in the
(Continued)

storage device, identify at least one first configuration value for scheduling a radio resource from the obtained environmental information, based on a learning model generated based on previously obtained environmental information, compare the first configuration value with at least one threshold value, adjust the first configuration value to a second configuration value, and transmit the adjusted second configuration value to the RAN.

20 Claims, 18 Drawing Sheets

(58) Field of Classification Search
CPC ..... H04L 1/0003; H04L 1/0009; H04L 41/00; H04L 41/16; G06N 20/00
See application file for complete search history.

(56) References Cited

U.S. PATENT DOCUMENTS

| | | | | |
|---|---|---|---|---|
| 2010/0203881 | A1* | 8/2010 | del Rio Romero | H04W 24/02 455/423 |
| 2011/0300873 | A1* | 12/2011 | Wen | H04W 16/02 455/450 |
| 2015/0023209 | A1* | 1/2015 | Gunnarsson | H04W 84/18 370/254 |
| 2019/0281542 | A1* | 9/2019 | Hévizi | H04W 24/04 |
| 2020/0053599 | A1* | 2/2020 | Damnjanovic | H04L 27/0006 |
| 2020/0187021 | A1* | 6/2020 | Shanmugaraju | H04L 1/203 |
| 2021/0119881 | A1* | 4/2021 | Shirazipour | H04L 41/0894 |
| 2021/0241090 | A1* | 8/2021 | Chen | H04W 24/02 |
| 2021/0250813 | A1* | 8/2021 | Zhou | H04W 24/02 |
| 2021/0258969 | A1 | 8/2021 | Yang et al. | |
| 2022/0191107 | A1* | 6/2022 | Ghadimi | H04L 41/147 |
| 2024/0430738 | A1* | 12/2024 | Eleftheriadis | H04W 52/0245 |

FOREIGN PATENT DOCUMENTS

| | | | |
|---|---|---|---|
| CN | 110139289 | B | 2/2023 |
| JP | 2021-83058 | A | 5/2021 |
| WO | 2020/131128 | A1 | 6/2020 |

OTHER PUBLICATIONS

Samsung. Discussion on Standard Impact for RAN Intelligence (Network Energy Saving). R3-213713, 3GPP TSG-RAN WG3 Meeting #113-e. Aug. 6, 2021, 9 pages total.

Intel Corporation. AI/ML based load balancing. R3-213470,3GPP TSG-RAN WG3 Meeting #113-e. Aug. 6, 2021, 13 pages total.

International Search Report (PCT/ISA/210) issued by the International Searching Authority on Dec. 9, 2022 in corresponding International Application No. PCT/KR2022/013700.

Written Opinion (PCT/ISA/237) issued by the International Searching Authority on Dec. 9, 2022 in corresponding International Application No. PCT/KR2022/013700.

Intel Corporation: "Use cases for AI/ML enabled NG-RAN", 3GPP Draft; R3-212301, 3rd Generation Partnership Project (3GPP), Mobile Competence Centre; 650, Route Des Lucioles ; F-06921 Sophia-Antipolis Cedex; France, vol. RAN WG3, No. Electronic meeting; 5 pages, May 7, 2021, XP052002402, https://ftp.3gpp.org/tsg ran/WG3 lu/TSGR3 112-e/Docs/R3-212301.zip, R3-212301.

Futurewei: "ML/AI for Wireless", 3GPP Draft; RWS-210038, 3rd Generation Partnership Project (3GPP), Mobile Competence Centre ; 650, Route Des Lucioles ; F-06921 Sophia-Antipolis Cedex; France, vol. TSG RAN, No. e-meeting; 13 pages, Jun. 7, 2021, XP052025603, https://ftp.3gpp.org/tsg ran/TSG RAN/TSGR AHs/2021 06 RAN Re118WS/Docs/RWS-210038.zip RWS-210038.pdf.

Communication issued Oct. 24, 2024 by the European Patent Office in European Patent Application No. 22881223.6.

Communication issued on Jun. 2, 2026 by Intellectual Property India in Indian Patent Application No. 202417035132.

Communication dated May 14, 2026 issued by the Korean Ministry of Intellectual Property in Korean Patent Application No. 10-2021-0135017.

* cited by examiner

ELECTRONIC DEVICE AND METHOD FOR PROVIDING SCHEDULING INFORMATION BASED ON LEARNING IN WIRELESS COMMUNICATION SYSTEM

CROSS-REFERENCE TO RELATED APPLICATIONS

This application is a continuation application of International Application No. PCT/KR2022/013700, filed on Sep. 14, 2022, which claims priority to Korean Patent Application No. 10-2021-0135017, filed on Oct. 12, 2021, in the Korean Intellectual Property Office, the disclosures of which are incorporated by reference herein their entireties.

BACKGROUND

1. Field

Various embodiments relate to an electronic device and a method for providing scheduling information, based on learning, in a wireless communication system and, for example, to a method for providing scheduling information by an electronic device (e.g., a learning agent) controlling a radio access network (RAN), based on learning.

2. Description of Related Art

An existing base station may be configured in a form in which a distributed unit (DU) and a radio unit or remote unit (RU) of the base station are installed together in a cell site. However, this unified configuration may have physical limitations. For example, according to an increase in service subscribers or traffic, an operator may need to newly establish a base station in a cell site. To overcome this problem, a centralized radio access network (RAN) or cloud RAN (C-RAN) structure may be configured. A C-RAN may have a structure in which a DU is disposed in one physical location and an RU is disposed in a cell site that transmits and/or receives radio signals to and/or from an actual user equipment (UE). The DU and the RU may be connected via an optical or coaxial cable. As the RU and the DU are separated, an interface standard for communication between the RU and the DU is required, and a standard, such as a common public radio interface (CPRI), may be used between the RU and the DU. In the 3rd Generation Partnership Project (3GPP), a base station structure is standardized, and an open radio access network (O-RAN), which is an open network standard that is applicable to a 5G system, is under discussion.

An O-RAN defines an RU, a DU, a central unit-control plane (CU-CP), and a central unit-user plane (CU-UP), which are existing 3GPP network elements (NEs), respectively as an O-RU, an O-DU, an O-CU-CP, and an O-CU-UP (which can be collectively referred to as an O-RAN base station), and additionally proposes a RAN intelligent controller (RIC) and a non-real-time RAN intelligent controller (NRT-RIC). The RIC may include a learning agent (e.g., a reinforcement learning (RL) agent). The RL agent may receive data from the RAN through an E2 interface and may output an operation associated with the RAN. The RAN may operate based on output from the RL agent. The RL agent may be based on, for example, a reinforcement learning model, and the reinforcement learning model may be updated through reinforcement learning. The RL agent may generate a parameter associated with the RAN, a performed operation, and a reward value as experiential information for reinforcement learning.

According to various embodiments, a scheduler in a RAN may allocate a radio resource for at least one user terminal (e.g., user equipment (UE)) connected to the RAN in view of various parameters (e.g., fairness, delay, and cell throughput). The various parameters are in a trade-off relationship and may thus be configured to increase performance indicators in a balanced manner while meeting operator requirements in scheduling.

According to various embodiments, when various configuration values for the scheduling of radio resources are optimized using artificial intelligence (AI), an action that adversely affects performance may also be performed, thereby degrading network performance.

Various embodiments may provide an electronic device and a method for providing scheduling information, based on learning, in a wireless communication system, which are capable of preventing application of an action that adversely affects performance by adjusting an action output through AI, based on a threshold value, when learning various configuration values for scheduling through the AI (e.g., an RL agent).

SUMMARY

An electronic device according to any one of various embodiments may include a storage device and at least one processor, wherein the at least one processor may obtain, from a radio access network (RAN), environmental information corresponding to each of at least one parameter associated the RAN, store the environmental information in the storage device, may identify at least one first configuration value for scheduling a radio resource from the obtained environmental information, based on a learning model generated based on previously obtained environmental information, may compare the at least one first configuration value with at least one threshold value, may adjust, based on a result of the comparison of the at least one first configuration value with the at least one threshold value, the at least one first configuration value to at least one second configuration value, and may transmit the at least one second configuration value to the RAN.

An electronic device according to any one of various embodiments may include a storage device and at least one processor, wherein the at least one processor may obtain, from a radio access network (RAN), environmental information corresponding to each of at least one parameter associated with the RAN, may identify at least one first configuration value for scheduling a radio resource from the obtained environmental information, based on a learning model generated based on previously obtained environmental information, may compare the at least one first configuration value with at least one threshold value, may adjust, based on a result of the comparison of the at least one first configuration value with the at least one threshold value, the at least one first configuration value to at least one second configuration value, and may store the at least one the adjusted second configuration value in the storage device and may input, into the learning model, the at least one second configuration value as data of the learning model.

An operating method of an electronic device for providing scheduling information by learning in a wireless communication system according to any one of various embodiments may include obtaining, from a radio access network (RAN), environmental information corresponding to each of at least one parameter associated with the RAN, identifying at least one first configuration value for scheduling a radio resource from the obtained environmental information, based on a learning model generated based on previously obtained environmental information, comparing the at least one first configuration value with at least one threshold value, adjusting, based on a result of the comparing of the at least one first configuration value with the at least one threshold value, the at least one first configuration value to at least one second configuration value, and inputting, into the learning model, the at least one second configuration value as data of the learning model.

According to various embodiments, it is possible to preventing application of an action that adversely affects performance by adjusting an action output through AI, based on a threshold value, when learning various configuration values for scheduling through the AI. For example, in configuring various configuration values for scheduling through the AI, it is possible to prevent a sudden deterioration in performance.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
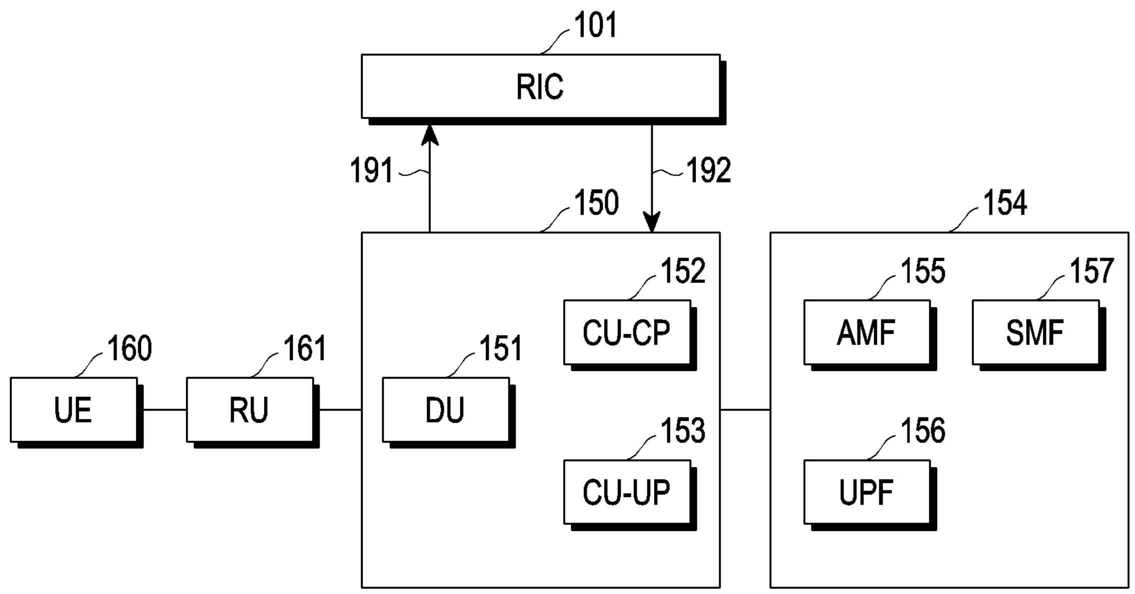
FIG. 1A is a block diagram illustrating an RIC, an RAN, and a core network (CN) according to various embodiments.

Hereinafter, exemplary embodiments of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

It should be noted that the technical terms used herein are only used to describe specific embodiments, and are not intended to limit the disclosure. Further, the technical terms used herein should be interpreted to have the same meaning as those commonly understood by a person skilled in the art to which the disclosure pertains, and should not be interpreted have excessively comprehensive or excessively restricted meanings unless particularly defined as other meanings. Further, when the technical terms used herein are wrong technical terms that cannot correctly represent the idea of the disclosure, it should be appreciated that they are replaced by technical terms correctly understood by those skilled in the art. Further, the general terms used herein should be interpreted as defined in dictionaries or interpreted in the context of the relevant part, and should not be interpreted to have excessively restricted meanings.

In addition, a singular expression used herein may include a plural expression unless they are definitely different in the context. As used herein, such an expression as “comprises” or “include” should not be interpreted to necessarily include all elements or all steps described in the specification, and should be interpreted to be allowed to exclude some of them or further include additional elements or steps.

The terms including an ordinal number, such as expressions “a first” and “a second” may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being “connected” or “coupled” to another element, it may be connected or coupled directly to the other element, or any other element may be interposer between them. In contrast, it should be understood that when an element is referred to as being “directly connected” or “directly coupled” to another element, there are no element interposed between them.

Hereinafter, exemplary embodiments of the disclosure will be described in detail with reference to the accompanying drawings. Regardless of drawing signs, the same or like elements are provided with the same reference numeral, and a repeated description thereof will be omitted. In describing the disclosure, descriptions related to technical contents well-known in the art and not associated directly with the disclosure will be omitted. Further, it should be noted that the accompanying drawings are presented merely to help easy understanding of the disclosure, and are not intended to limit the disclosure. The technical idea of the disclosure should be construed to cover all changes, equivalents, and alternatives, in addition to the drawings.

FIG. 1A is a block diagram illustrating a RIC, a RAN, and a core network (CN), according to various embodiments.

According to various embodiments, the RAN 150 may include at least one of at least one distributed unit (DU) 151, at least one central unit-control plane (CU-CP) 152, or at least one central unit-user plane (CU-UP) 153. Although the RAN 150 is illustrated as being connected to at least one remote unit or radio unit (RU) 161, which is for illustration, at least one RU 161 may be connected to the RAN 150 or may be included in the RAN 150. The RAN 150 may be an open radio access network (O-RAN), in which case the DU 151 may be an O-DU, the CU-CP 152 may be an O-CU-CP, the CU-UP 153 may be an O-CU-UP, and the RU 161 may be an O-RU.

According to various embodiments, the RU 161 may perform communication (e.g., transmit and/or receive signals) with at least one user equipment (UE) 160. The RU 161 may be a logical node that provides a low physical layer (low-PHY) function and radio frequency (RF) processing. The DU 151 may be a logical node that provides functions of radio link control (RLC), medium access control (MAC), and high-PHY layers, and may be connected to, for example, the RU 161. CUs 152 and 153 may be logical nodes that provide functions of a radio resource control (RRC), a service data adaptation protocol (SDAP), and a packet data convergence protocol (PDCP). The CU-CP 152 may be a logical node that provides functions of a control plane part of the RRC and the PDCP. The CU-UP 153 may be a logical node that provides functions of a user plane part of the SDAP and the PDCP.

According to various embodiments, the core network (e.g., 5th generation core (5GC)) 154 may include at least one of an access and mobility management function (AMF) 155, a user plane function (UPF) 156, or a session management function (SMF) 157. The AMF 155 may provide a function for access and mobility management in a unit of the UE 160. The SMF 157 may provide a session management function. The UPF 156 may transmit downlink data received from a data network to the UE 160, or may transmit uplink data received from the UE 160 to the data network. For example, the CU-CP 152 may be connected to the AMF 155 through an N2 interface (or an next generation application protocol (NGAP) interface). The AMF 155 may be connected to the SMF 157 through an N11 interface. The CU-UP 153 may be connected to the UPF 153 through an N3 interface.

According to various embodiments, the RAN intelligent controller (RIC) 101 may customize RAN functionality for service or regional resource optimization. The RIC 101 may provide at least one function of network intelligence (e.g., policy enforcement and handover optimization), resource assurance (e.g., radio-link management and an advanced self-organized-network), and resource control (e.g., load balancing and a radio resource scheduling or slicing policy), and there is no limit on a function (or performed operation) associated with the RAN 150 that the RIC 101 can provide.

According to various embodiments, the RIC 101 may transmit and/or receive E2 messages 191 and 192 to and/or from the RAN 150. For example, the RIC 101 may be connected to the DU 151 through an E2-DU interface (not shown). For example, the RIC 101 may be connected to the CU-CP 152 through an E2-CP interface (not shown). For example, the RIC 101 may be connected to the CU-UP 153 through an E2-UP interface (not shown). At least one interface between the RIC 101 and the RAN 150 may be referred to as an E2 interface. Although the RIC 101 is shown as a separate device from the RAN 150, which is for illustration, the RIC 101 and the RAN 150 may be configured as separate devices or may be configured as a single device.

According to various embodiments, the RIC 101 may transmit and/or receive the E2 messages 191 and 192 to and/or from an E2 node (e.g., at least one of the DU 151, the CU-CP 152, or the CU-UP 153). The E2 node may include (or provide) an E2 node function. The E2 node function may be configured based on specific application S/W (xApp) installed in the RIC 101. When a function of a key performance indicator (KPI) monitor is provided, KPI monitor collection S/W may be installed in the RIC 101. The E2 node may generate KPI parameters and may include the E2 node function of forwarding an E2 message 191, including a KPI parameter, to an E2 termination function located in the RIC 101. That is, the E2 node may be configured to transmit the E2 message 191 to the E2 termination in the RIC 101, where the E2 message 191 may include a KPI parameter. The E2 termination function located in the RIC 101 is a termination of the RIC 101 for the E2 message, and may interpret the E2 message forwarded by the E2 node and may then forward the E2 message to the xApp.

The RIC 101 may provide information associated with an operation of the RAN 150 to the RAN 150 via an E2 message 192. As will be described later, an RL agent of the RIC 101 may obtain state information or reward information for scheduling a radio resource as input. For example, the state information for scheduling the radio resource may include at least one of a throughput for at least one UE connected to the RAN 150 or a modulation and coding scheme (MCS) for the at least one UE. The reward information received for scheduling the radio resource may include at least one of delay information about at least one UE connected to the RAN 150 or a cumulative transport block size (TBS) for the at least one UE.

According to various embodiments, the RL agent of the RIC 101 may provide an output value corresponding to the information obtained from the RAN 150 to the RAN 150. Output from the RL agent of the RIC 101 may be an operation (or action or RAN policy) of at least one entity of the RAN 150, and the at least one entity of the RAN 150 may operate based on the received information. Information (e.g., action) provided from the RIC 101 to the RAN 150 may include at least one configuration value for scheduling a radio resource. The at least one configuration value for scheduling the radio resource may include information related to radio resource allocation for a plurality of UEs connected to the RAN 150. The information related to the radio resource allocation may include information corresponding to at least one parameter for allocating, based on proportional fairness (PF), a radio resource. The at least one parameter for allocating, based on the PF, the radio resource may include at least one of a parameter corresponding to an increase in fairness, a parameter corresponding to an increase in throughput, or a parameter corresponding to the number of sub-bands allocable within a configured time period.

Figure 1B:
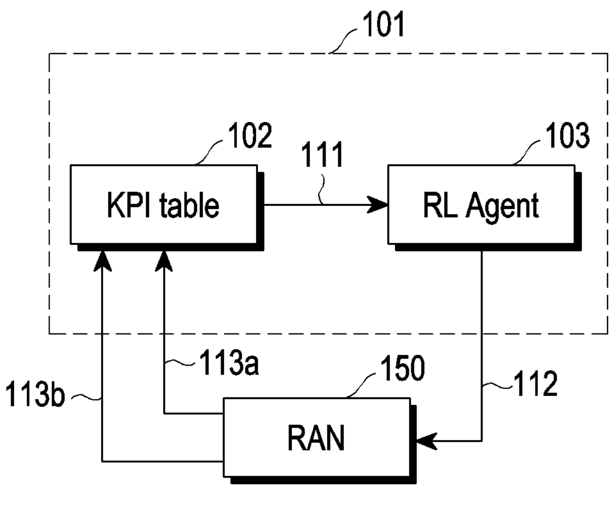
FIG. 1B is a block diagram illustrating an RIC according to various embodiments.

FIG. 1B is a block diagram illustrating an RIC according to various embodiments. According to various embodiments, at least one of a database (e.g., a KPI table) 102 or an RL agent 103 may be defined (and/or stored) in the RIC 101. Alternatively, the database 102 may be referenced and/or the RL agent 103 may be executed by the RIC 101, and the database 102 and/or the RL agent 103 do not need to be necessarily stored in the RIC 101. Although an embodiment to be described later shows that the RIC 101 includes the RL agent 103 based on reinforcement learning as an example of an artificial intelligence (AI) learning module, the RIC 101 may include a learning module based on at least one of supervised learning, unsupervised learning, or semi-supervised learning in addition to reinforcement learning.

According to various embodiments, the database 102 (e.g., the KPI table) may include information about parameters and operations (or actions) associated with a RAN by a plurality of time points. A parameter may be referred to as, for example, performance information. An action may be referred to as, for example, configuration information. According to various embodiments, each parameter stored in the database 102 may be, for example, a parameter for indicating the state (or environment) of the RAN. For example, parameters for forming the KPI table may include at least one of a packet data rate, cell traffic, information associated with the reception strength of a UL signal (at least one of reference signal received power (RSRP), reference signal received quality (RSRQ), or reference signal strength indicator (RSSI)), a channel quality indicator (CQI), channel state information (CSI), the number of connected UEs, PDCP throughput, physical resource block (PRB) usage, UE mobility statics, physical resource block (PRB) utilization, control channel element (CCE) utilization, a PDCP buffer state, downlink latency, or the number of PDU sessions, and may include any information for indicating the state (or environment) of the RAN without being limited. The action may refer to an operation to be performed by at least one entity included in the RAN. For example, the action may include at least one of information associated with UE scheduling (e.g., UE scheduling priority), bearer reselection decision, UE mobility (e.g., handover), carrier aggregation (CA)-associated information, or dual connectivity (DC)-related information, and may include any information to be performed by an entity included in the RAN without being limited. For example, as described above in FIG. 1A, the action may include at least one configuration value for scheduling a radio resource. The at least one configuration value for scheduling the radio resource may include information related to radio resource allocation for a plurality of UEs connected to the RAN 150. The information related to the radio resource allocation may include information corresponding to at least one parameter for allocating, based on proportional fairness (PF), a radio resource. The at least one parameter for allocating, based on the PF, the radio resource may include at least one of a parameter corresponding to an increase in fairness, a parameter corresponding to an increase in throughput, or a parameter corresponding to the number of sub-bands allocable within a configured time period.

According to various embodiments, the RL agent 103 may obtain, as an input value, a parameter indicating the state (or environment) of the RAN at a specific time point by referring to the database 102. At least part of the information stored in the database 102 may be updated, for example, based on information about the state of the RAN previously obtained by the RIC 101. For example, the RL agent 103 may be configured to provide assurance of service level agreements, and may output a UE scheduling priority as an action. Alternatively, the RL agent 103 may be configured to provide an SLS DU actor action, and may output the UE scheduling priority as an action. Alternatively, the RL agent 103 may be configured to provide a traffic steering DU actor action, and may output a bearer reselection decision (and/or a split ratio by radio access technology (RAT) (e.g., evolved universal terrestrial radio access (E-UTRA):NR is 0.6:0.4)) as an action. The RL agent 103 may be applied to only one cell, or may be applied to a plurality of cells.

According to various embodiments, the RL agent 103 may include (or execute) at least one model generated through reinforcement learning. The RL agent 103 may process the parameter 111 indicating the state of the RAN at the specific time point obtained as the input value, and may output an action 112 to the RAN 150.

Figure 1C:
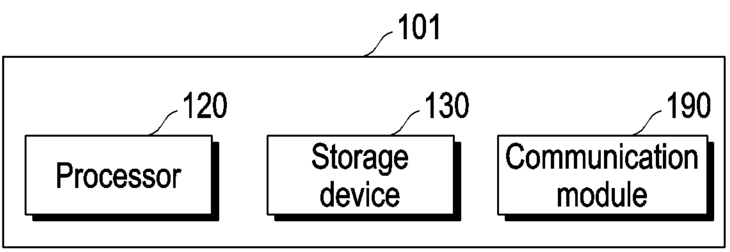
FIG. 1C is a block diagram illustrating the hardware configuration of an RIC according to various embodiments.

FIG. 1C is a block diagram illustrating the hardware configuration of an RIC according to various embodiments. According to various embodiments, referring to FIG. 1C, the RIC 101 (or an electronic device configured to perform a function of the RIC 101) may include at least one of a processor 120, a storage device 130, or a communication module 190.

According to various embodiments, the processor 120 may execute, for example, software (e.g., a program) to control at least one different component (e.g., a hardware or software component) of the RIC 101 (or the electronic device configured to perform the function of the RIC 101) connected to the processor 120, and may perform various data processing or operations. The software may include, for example, at least some of an RL agent 103 (or a program for executing or accessing the RL agent 103), an empirical data generator (or a program for executing or accessing the empirical data generator), and an RL learner (or a program for executing or accessing the RL learner) (when the RL leaner is included in the RIC 101) without being limited.

According to an embodiment, as at least some of the data processing or operations, the processor 120 may store a command or data received from a different component in the storage device 130, may process the command or data stored in the storage device 130, and may store resulting data in the storage device 130. According to an embodiment, the processor 120 may include at least some of a central processing unit, an application processor, a neural processing unit (NPU), or a communication processor, but the type of the processor 120 is not limited. The neural processing unit may include a hardware structure specialized in processing an artificial intelligence model. The artificial intelligence model (e.g., the RL agent 103 (or a model included or executed in the RL agent 103)) may include machine learning (e.g., reinforcement learning, supervised learning, unsupervised learning, or semi-supervised learning), but is not limited to these examples. The artificial intelligence model may include a plurality of artificial neural network layers. An artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but is not limited to these examples. The artificial intelligence model may additionally or alternatively include a software structure in addition to the hardware structure. It will be understood by those skilled in the art that the storage device 130 is any device capable of storing data, such as a disk (e.g., hard-disk drive (HDD)). In various embodiments, an operation of at least one of the RL agent 103, the RL learner, or the empirical data generator may be understood as an operation by the processor 120 or an operation by other hardware (e.g., at least one of the storage device 130 or the communication module 190) under control of the processor 120. An instruction for the operation of at least one of the RL agent 103, the RL learner, or the empirical data generator may be stored in the storage device 130.

According to various embodiments, the storage device 130 may store various data used by at least one component (e.g., the processor 120 or the communication module 190) of the RIC 101 (or the electronic device configured to perform the function of the RIC 101). The data may include, for example, software and input data or output data about a command related to the software. The storage device 130 may correspond to the database 102 that stores the foregoing KPI table.

According to various embodiments, the communication module 190 may establish a direct (e.g., wired) communication channel or a wireless communication channel between the RIC 101 (or the electronic device configured to perform the function of the RIC 101) and an external electronic device (e.g., an E2 node) and may support performing communication through the established communication channel. The communication module 190 is not limited in type as long as the communication module 190 can support, for example, an E2 interface. When the RIC 101 and the RAN 150 are configured as a single device, the communication module 190 may refer to an interface for both entities. When the RL learner is configured outside the RIC 101, the RIC 101 may transmit and/or receive data to and from the RL learner via the communication module 190.

Figure 2:
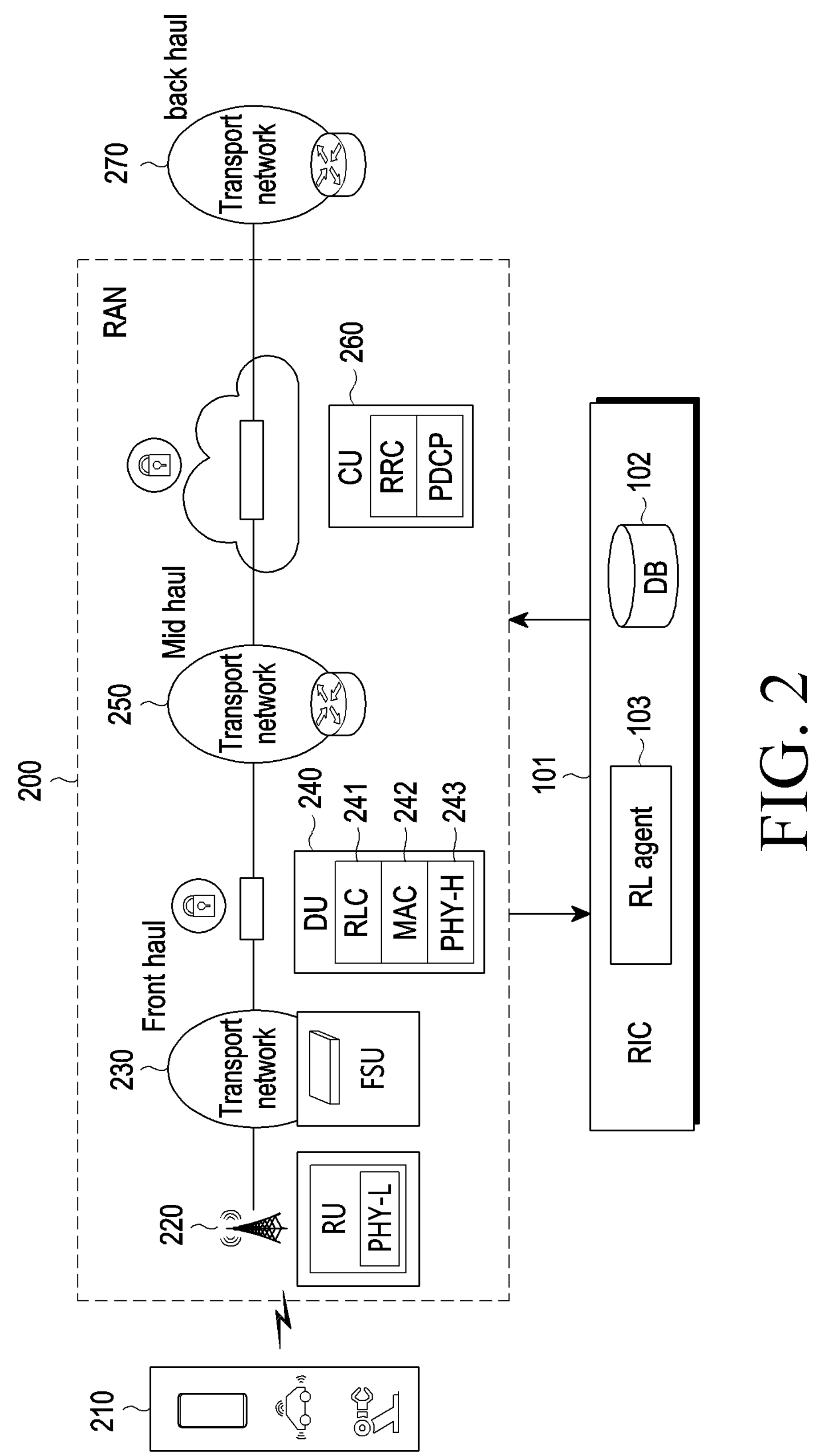
FIG. 2 illustrates an example of the configuration of a radio access network according to various embodiments.

FIG. 2 illustrates an example configuration of a RAN system according to various embodiments of the disclosure. Referring to FIG. 2, the RAN system 200 may include at least one of an RU 220, an electronic device including a function of a digital (or distribution) unit (DU) 240 (hereinafter DU 240), and an electronic device including a function of a central/cloud unit (CU) 260 (hereinafter CU 260). The DU 240 and the CU 260 of the RAN system 200 may correspond to the RAN 150 of FIG. 1. The RU 220 may communicate with a UE 210 via a radio space. The UE 210 may be referred to as an electronic device, a terminal, a mobile equipment (ME), a UE, a user terminal (UT), a subscriber station (SS), a wireless device, a handheld device, or an access terminal (AT). The UE 210 may be a device having a communication function, such as a mobile phone, a personal digital assistant (PDA), a smart phone, a wireless modem, or a laptop computer.

The RU 220 may perform processing corresponding to a low physical layer (PHY-L) on transmitted or received wireless communication data. The processing corresponding to the low physical layer may include at least one of channel coding, antenna mapping, and data modulation. The RU 220 may include a radio-frequency (RF) module or an inter-frequency (IF) module, and may convert the low physical layer-processed data from a digital signal to an analog signal by a digital-to-analog converter (DAC) and then into an IF signal or an RF signal. The data converted into the RF signal may be transmitted to the wireless space through an antenna.

The electronic device including the function of the DU 240 may communicate with the RU 220 by wire through a transport network 230. A path between the RU 220 and the electronic device including the function of the DU 240 may be referred to as a front haul. The DU 240 may receive the low physical layer-processed data from the RU 220, and may process the data in a high physical layer (PHY-H) entity 243. High physical layer processing may be variously defined, and may include processing, such as forward error correction (FEC) or symbol mapping. The DU 240 may process the high physical layer-processed data in a media access control (MAC) entity 242 and a radio link control (RLC) entity 241.

The electronic device including the function of the CU 260 may communicate with the electronic device including the function of the DU 240 by wire through a transport network 250. A path between the electronic device including the function of the DU 240 and the electronic device including the function of the CU 260 may be referred to as a mid haul. The CU 260 may receive the RLC layer-processed data from the DU 240 and may perform packet data convergence protocol (PDCP) layer processing and radio resource control (RRC) layer processing thereon.

According to various embodiments, processing corresponding to a wireless communication protocol layer performed in the DU 240 or the CU 260 may be configured in the form of a virtualized software module (e.g., a VNF module 121) dynamic and generally executable in an electronic device (and/or server) having a general-purpose processor. The electronic device including the function of the CU 260 may communicate with a core network 154 through a transport network 270 referred to as a back haul.

According to various embodiments, the RIC 101 may include a database 102 (and/or a storage device 130) and an RL agent 103. In the following description, the RL agent 103 may include an RL learner, which may be configured separately from the RL agent 103.

Figure 3A:
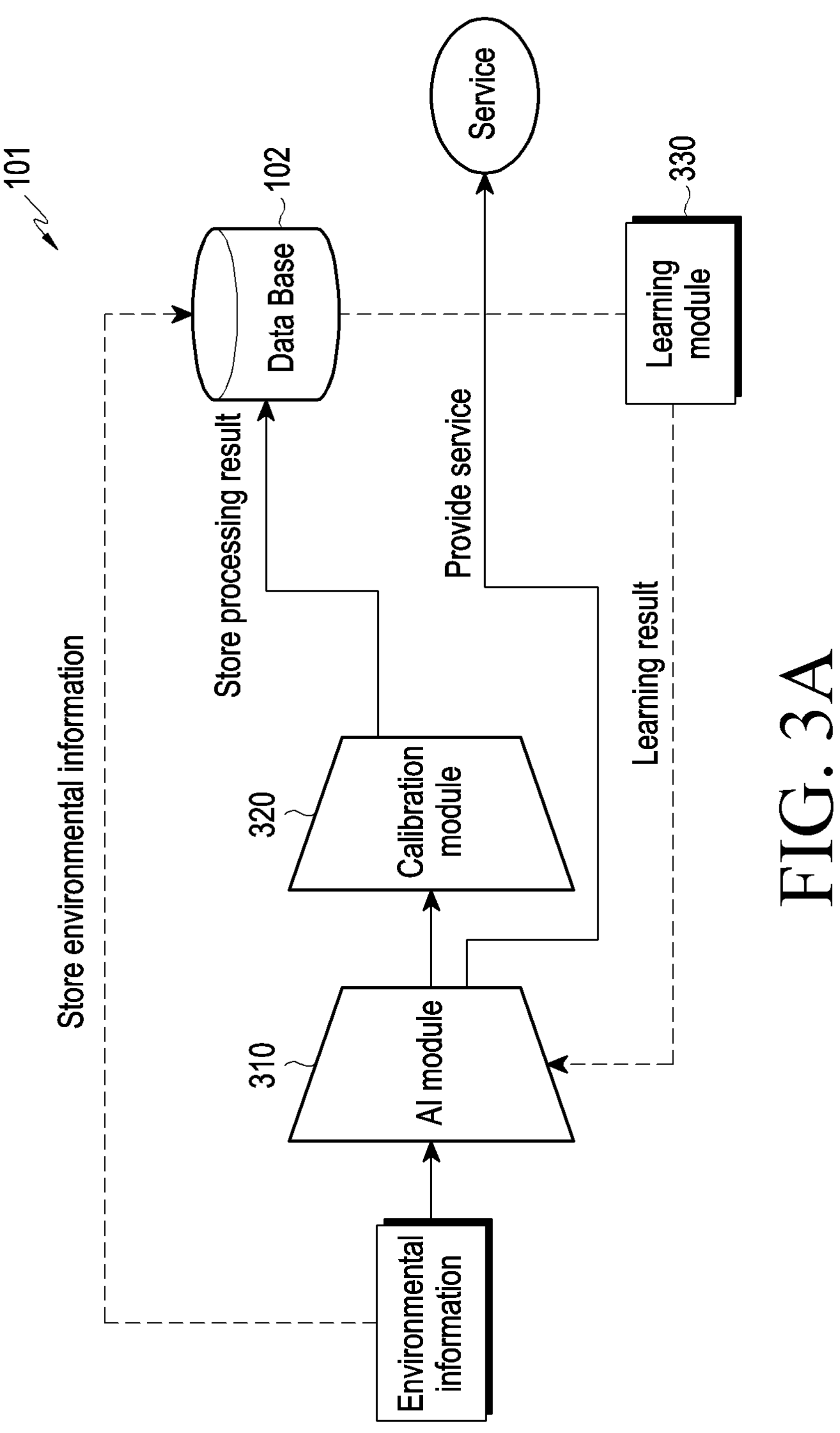
FIG. 3A illustrates an example of the configuration of a RIC, according to various embodiments.

FIG. 3A illustrates an example of the configuration of a RIC according to various embodiments. Referring to FIG. 3A, according to various embodiments, the RIC 101 may include an AI module 310, a calibration module 320, a learning module 330, and a database 102. The AI module 310 may correspond to the RL agent 103, and the learning module 330 may correspond to the RL learner.

According to various embodiments, the AI module 310 of the RIC 101 may receive environmental information from a RAN 150 (not shown). The environmental information received from the RAN 150 may be stored in the database 102. For example, as described above, the environmental information may include state information or reward information for scheduling a radio resource. The state information for scheduling the radio resource may include at least one of a throughput for at least one UE connected to the RAN 150 or a modulation and coding scheme (MCS) for the at least one UE. The reward information received for scheduling the radio resource may include at least one of delay information about at least one UE connected to the RAN 150 or a cumulative transport block size (TBS) for the at least one UE.

According to various embodiments, the AI module 310 may provide information output based on a learning result by the learning module 330 as service information to the RAN 150. According to various embodiments, as described above, output from the AI module 310 may be an operation (or action or RAN policy) of at least one entity of the RAN 150, and the at least one entity of the RAN 150 may operate based on the received information. According to various embodiments, information (e.g., action) provided from the AI module 310 to the RAN 150 may include at least one configuration value for scheduling a radio resource. The at least one configuration value for scheduling the radio resource may include information related to radio resource allocation for a plurality of UEs connected to the RAN 150. The information related to the radio resource allocation may include information corresponding to at least one parameter for allocating, based on proportional fairness (PF), a radio resource. The at least one parameter for allocating, based on the PF, the radio resource may include at least one of a parameter corresponding to an increase in fairness, a parameter corresponding to an increase in throughput, or a parameter corresponding to the number of sub-bands allocable within a configured time period.

According to various embodiments, the action (e.g., the at least one configuration value for scheduling the radio resource) output from the AI module 310 may be transmitted to the calibration module 320. The calibration module 320 may also be referred to as a clipping module but is not limited thereto. The calibration module 320 may compare the action (e.g., the at least one configuration value for scheduling the radio resource) output based on the learning model with at least one threshold value, and may adjust the configuration value of the action based on the result of comparison with the at least one threshold value. For example, the calibration module 320 may identify at least one first configuration value for scheduling the radio resource received from the AI module 310, and may compare the first configuration value with the at least one threshold value. The calibration module 320 may adjust the first configuration value to a second configuration value, based on the result of the comparison of the first configuration value with the at least one threshold value, and may store the adjusted second configuration value in the database 102. According to various embodiments, the at least one threshold value may include a first threshold value corresponding to a previous configuration value (e.g., a previous action), and the second configuration value may be determined within a configured range from the first threshold value. For example, the calibration module 320 may limit variance from the previous configuration value, based on the first threshold value. According to various embodiments, the at least one threshold value may include a second threshold value corresponding to an initial configuration value (e.g., an initially configured action), and the second configuration value may be determined within a configured range from the second threshold value. For example, the calibration module 320 may limit variance from the initial configuration value, based on the second threshold value. A specific embodiment in which the calibration module 320 adjusts the configuration value, based on the first threshold value or the second threshold value will be described later with reference to FIG. 6.

According to various embodiments, the configuration value adjusted by the calibration module 320 may be stored in the database 102, and the adjusted configuration value stored in the database 102 may be input to the learning module 330 and may be used for learning. According to various embodiments, the learning module 330 may perform learning by the adjusted configuration value (e.g., an adjusted action). According to various embodiments, the AI module 310 may output the configuration value to the RAN 150, based on a learning result by the adjusted configuration value. The AI module 310 may output the configuration value, based on the learning result by the adjusted configuration value, thereby preventing network performance from suddenly deteriorating due to a sudden change in the configuration value.

Figure 3B:
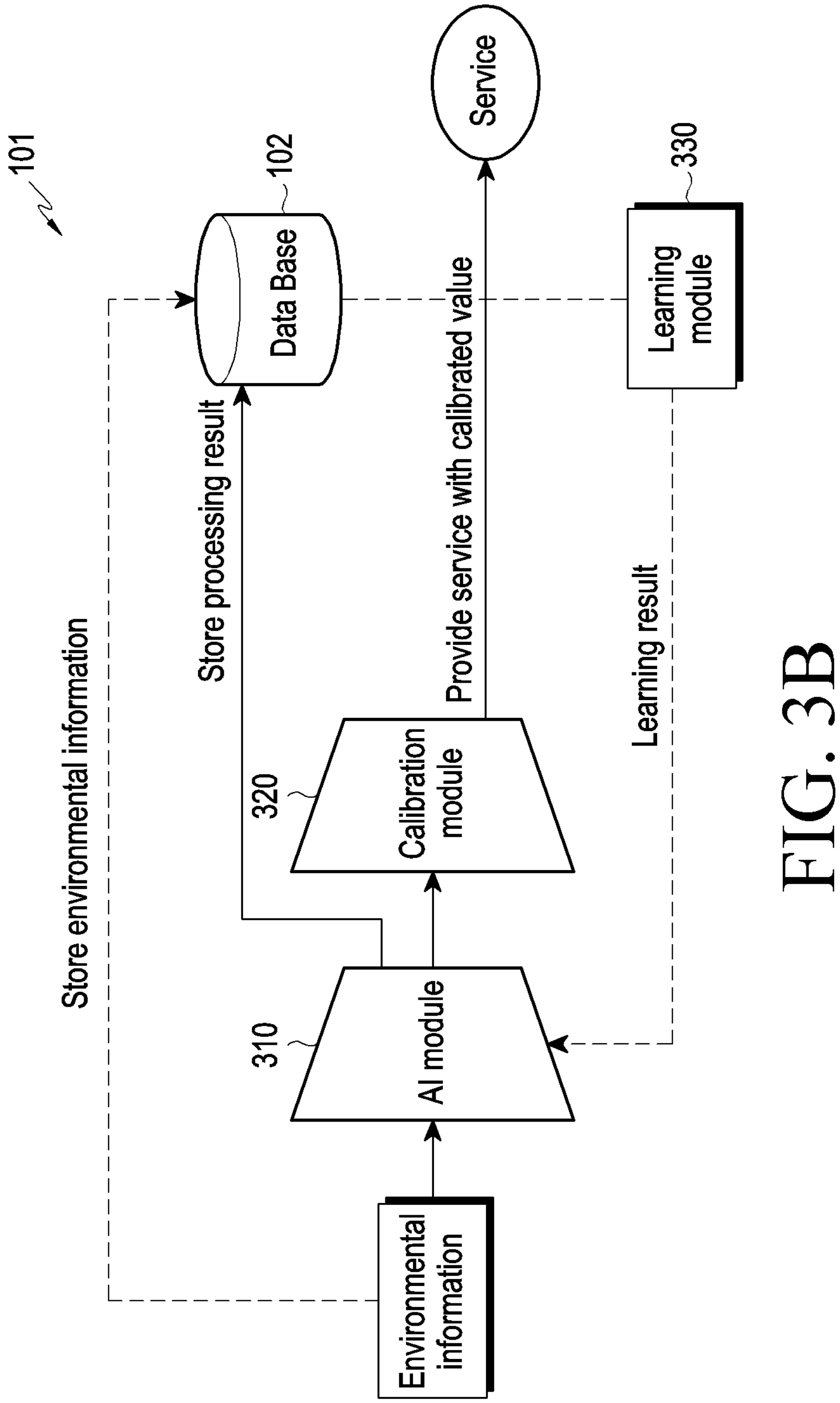
FIG. 3B illustrates an example of the configuration of a RIC, according to various embodiments.

FIG. 3B illustrates an example of the configuration of a RIC according to various embodiments. Referring to FIG. 3B, according to various embodiments, the RIC 101 may include an AI module 310, a calibration module 320, a learning module 330, and a database 102. The AI module 310 may correspond to the RL agent 103, and the learning module 330 may correspond to the RL learner.

According to various embodiments, the AI module 310 of the RIC 101 may receive environmental information from a RAN 150. The environmental information received from the RAN 150 may be stored in the database 102. For example, as described above, the environmental information may include state information or reward information for scheduling a radio resource. The state information for scheduling the radio resource may include at least one of a throughput for at least one UE connected to the RAN 150 or a modulation and coding scheme (MCS) for the at least one UE. The reward information received for scheduling the radio resource may include at least one of delay information about at least one UE connected to the RAN 150 or a cumulative transport block size (TBS) for the at least one UE.

According to various embodiments, the AI module 310 may provide information output based on a learning result by the learning module 330 as service information to the calibration module 320. According to various embodiments, as described above, output from the AI module 310 may be an operation (or action or RAN policy) of at least one entity of the RAN 150, and the at least one entity of the RAN 150 may operate based on the received information. According to various embodiments, information (e.g., action) provided from the AI module 310 to the calibration module 320 may include at least one configuration value for scheduling a radio resource. The at least one configuration value for scheduling the radio resource may include information related to radio resource allocation for a plurality of UEs connected to the RAN 150. The information related to the radio resource allocation may include information corresponding to at least one parameter for allocating, based on proportional fairness (PF), a radio resource. The at least one parameter for allocating, based on the PF, the radio resource may include at least one of a parameter corresponding to an increase in fairness, a parameter corresponding to an increase in throughput, or a parameter corresponding to the number of sub-bands allocable within a configured time period.

According to various embodiments, the action (e.g., the at least one configuration value for scheduling the radio resource) output from the AI module 310 may be transmitted to the calibration module 320. The calibration module 302 may also be referred to as a clipping module but is not limited thereto. The calibration module 320 may compare the action (e.g., the at least one configuration value for scheduling the radio resource) output based on the learning model with at least one threshold value, and may adjust the configuration value of the action based on the result of the comparison with the at least one threshold value. For example, the calibration module 320 may identify at least one first configuration value for scheduling the radio resource received from the AI module 310, and may compare the first configuration value with the at least one threshold value. The calibration module 320 may adjust the first configuration value to a second configuration value, based on the result of the comparison with the at least one threshold value, and may transmit the adjusted second configuration value to the RAN 150. According to various embodiments, the at least one threshold value may include a first threshold value corresponding to a previous configuration value (e.g., a previous action), and the second configuration value may be determined within a configured range from the first threshold value. For example, the calibration module 320 may limit variance from the previous configuration value, based on the first threshold value. According to various embodiments, the at least one threshold value may include a second threshold value corresponding to an initial configuration value (e.g., an initially configured action), and the second configuration value may be determined within a configured range from the second threshold value. For example, the calibration module 320 may limit variance from the initial configuration value, based on the second threshold value. A specific embodiment in which the calibration module 320 adjusts the configuration value, based on the first threshold value or the second threshold value will be described later with reference to FIG. 6. The configuration value adjusted by the calibration module 320 may be input to the RAN 150 and may be used for scheduling. According to various embodiments, the calibration module 320 may output the adjusted configuration value to the RAN 150, thereby preventing network performance from suddenly deteriorating due to a sudden change in the configuration value.

According to various embodiments, the action (e.g., the at least one configuration value for scheduling the radio resource) output from the AI module 310 may be stored in the database 102. The action (e.g., the at least one configuration value for scheduling the radio resource) stored in the database 102 may be input to the learning module 330 and may be used for learning. According to various embodiments, the learning module 330 may perform learning by the action (e.g., the at least one configuration value for scheduling the radio resource) stored in the database.

Figure 3C:
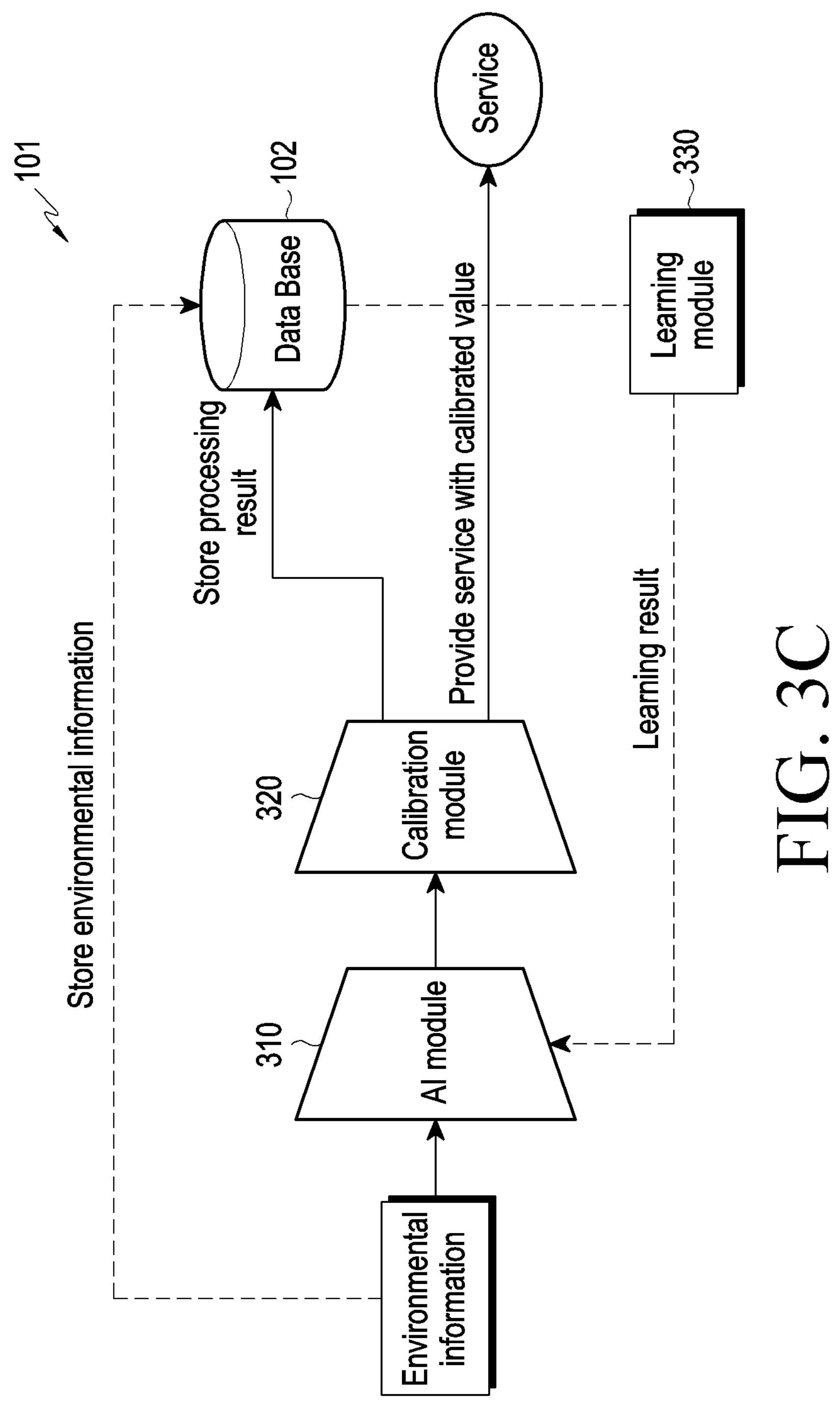
FIG. 3C illustrates an example of the configuration of a RIC, according to various embodiments.

FIG. 3C illustrates an example of the configuration of a RIC according to various embodiments. FIG. 3C is different from FIG. 3B in that an output value of a calibration module 320 is stored in a database 102 instead of an output value of an AI module 310, and the output value of the calibration module 320 stored in the database 102 is used for learning for a learning module 330. A description of operations of FIG. 3C which are the same as or similar to those of FIG. 3B will be omitted.

Figure 4:
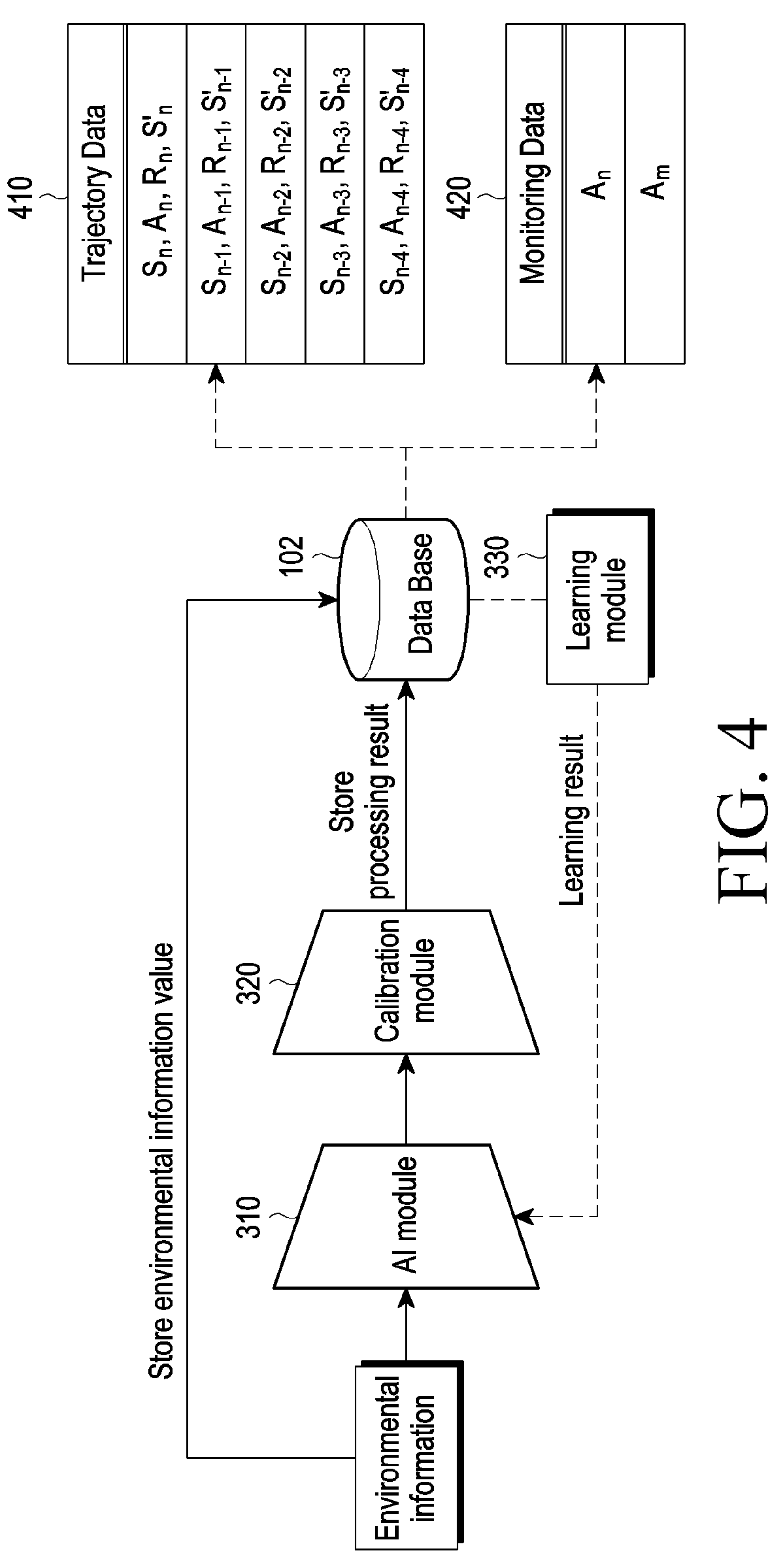
FIG. 4 illustrates an example of data stored in a database, according to various embodiments.

FIG. 4 illustrates an example of data stored in a database according to various embodiments. Referring to FIG. 4, as described above in FIG. 3A or FIG. 3C, a configuration value adjusted by a calibration module 320 may be stored in a database.

According to various embodiments, data stored in the database 102 may include trajectory data 410 and/or monitoring data 420. For example, the trajectory data 410 may include environmental information collected from a RAN 150 at each time point, and may include state data $S_n$ and reward data $R_n$. The trajectory data 410 may further include action data $A_n$ which is output of an AI module 310. The trajectory data 410 may be provided to a learning module 330 and may be used for learning. The trajectory data 410 may be collected for a configured period, and may be learned through the learning module 330, based on data collected during the configured period.

According to various embodiments, the monitoring data 420 may include recent action data $A_n$ output at a previous time point and/or initial action data $A_n$. For example, the recent action data may correspond to the foregoing first threshold value, and the initial action data may correspond to the foregoing second threshold value. The monitoring data 420 may be referred to for adjustment of an action (or configured value) in the calibration module 320.

Figure 5:
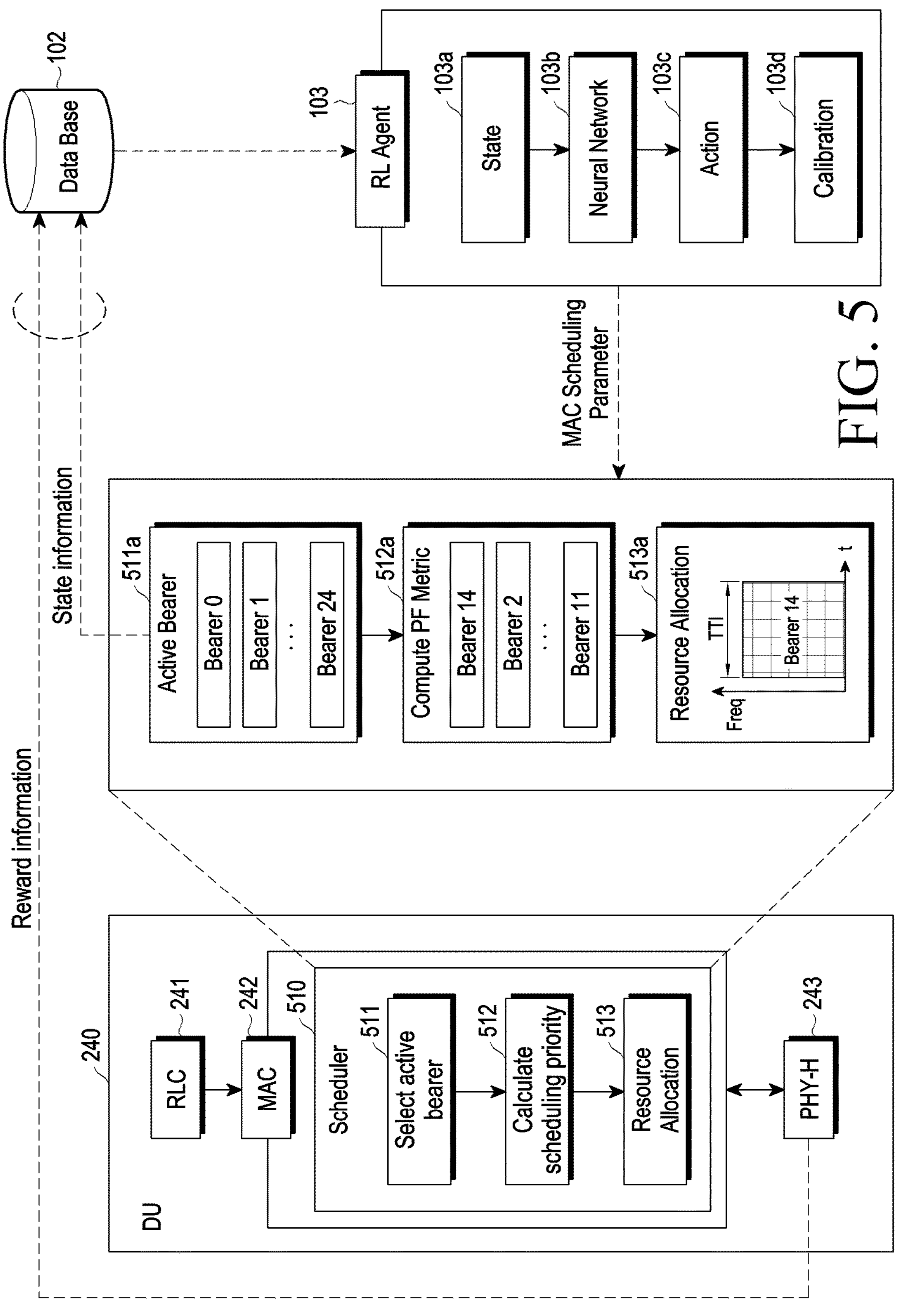
FIG. 5 illustrates a processing operation between a RAN and a RL agent, according to various embodiments.

FIG. 5 illustrates a processing operation between a RAN and an RL agent, according to various embodiments. Referring to FIG. 5, a RIC 101 may receive state information and/or reward information as environmental information from a DU 240 of a RAN 150 and may store the same in a database 102. For example, the RIC 101 may receive the state information collected from a MAC entity 242 of the DU 240 and may store the same in the database 102. For example, the state information received by the RIC 101 from the RAN 150 for scheduling a radio resource may include at least one of a throughput for at least one UE connected to the RAN 150 or a modulation and coding scheme (MCS) for the at least UE.

According to various embodiments, the RIC 101 may receive the reward information collected from a PHY-H entity 243 of the DU 240 and may store the same in the database 102. For example, the reward information received by the RIC 101 from the RAN 150 for scheduling a radio resource may include at least one of delay information about at least one UE connected to the RAN 150 or a cumulative transport block size (TBS) for the at least one UE. For example, the information stored in the database 102 may be configured as shown below in Table 1.

TABLE 1

| Information | MDP element | Range | Type |
|---|---|---|---|
| Average throughput information of UE | State | 0-36.7(Mbps) | Float |
| MCS information of UE | State | 0-28 (index) | Integer |
| Delay information of UE | Reward | 0-2,048 (Time to Interactive (TTI)) | Integer |
| Cumulative TBS information of UE | Reward | 0-75, 161.6 (Mbit) | Integer |

According to various embodiments, the MAC entity 242 may include a scheduler 510 that performs a scheduling function for a radio resource. The scheduler 510 may select an active bearer 511*a* from a bearer candidate list including a plurality of bearers in operation 511. For example, the scheduler 510 may select 24 bearers as active bearers from a list of 10,499 bearer candidates. Various criteria for the scheduler 510 to select an active bearer may be configured. For example, the scheduler 510 may select N (e.g., 24) bearers having a buffer occupancy of greater than 0 among bearers (e.g., default EPS bearers) of a non-guaranteed bit rate (non-GBR) using Round-Robin.

According to various embodiments, the scheduler 510 may calculate a scheduling priority for each active bearer 511*a* in operation 512. The scheduling priority may be calculated using a proportional fair (PF) method. According to various embodiments, in operation 513, the scheduler 510 may allocate a resource, based on the active bearers arranged according to the priority. For example, the scheduler 510 may allocate a maximum number of resource blocks (RBs) allocable in each slot, based on the active bearers arranged according to the priority.

According to various embodiments, an RL agent 103 (e.g., the AI module 310 and/or the learning module 330) of the RIC 101 may receive the state information and the reward information stored in the database 102, may output an action as described above in FIG. 3A, FIG. 3B, or FIG. 3C, and provide the output action to the RAN 150. For example, the RL agent 103 may input the state information 103*a* to a learned neural network 103*b*, and may output the action 103*c* as a result of an operation of the neural network 103*b*. According to various embodiments, the RL agent 103 may provide the action 103*c* to a calibration module (e.g., the calibration module 320 of FIG. 3A, FIG. 3B, or FIG. 3C). The calibration module may receive and adjust the action 103*c* and may then provide an adjusted action 103*d* to the scheduler 510 of the RAN 150. The scheduler 510 may apply the adjusted action 103*d* received from the RIC 101 to operation 512 of calculating the scheduling priority and operation 513 of allocating the resource. For example, the action 103*d* may include a configuration value corresponding to at least one parameter as shown below in Table 2.

TABLE 2

| Output information | Range | Type |
|---|---|---|
| α | 0-10 | Float |
| β | 0-10 | Float |
| γ | 1-10 | Integer |

Referring to Table 2, α or β may be a parameter used for the scheduler 510 to calculate a PF metric 512*a* in operation 512, and γ may be a parameter used for the scheduler 510 to allocate the resource 513*a* in operation 513. For example, the scheduler 510 may determine the priority $P_i(t)$ for the active bearer, based on Equation 1.

$$P_i(t) = \frac{(R_i(t))^{\beta}}{(A_i(t))^{\alpha}} \times W_i \quad \text{[Equation 1]}$$

In Equation 1, $R_i(t)$ may denote data receivable at time t for bearer i, $A_i(t)$ may denote an average throughput at time t for bearer i, and $W_i$ may denote a weight specified by a user for bearer i. For example, the throughput may increase as β, which is the index of $R_i(t)$, increases, and fairness may increase as α, which is the index of $A_i(t)$, increases. An operator may configure α and/or β in view of throughput and fairness, which are in a trade-off relationship, thereby determining the priority for the PF metric 512*a*.

Figure 9A:
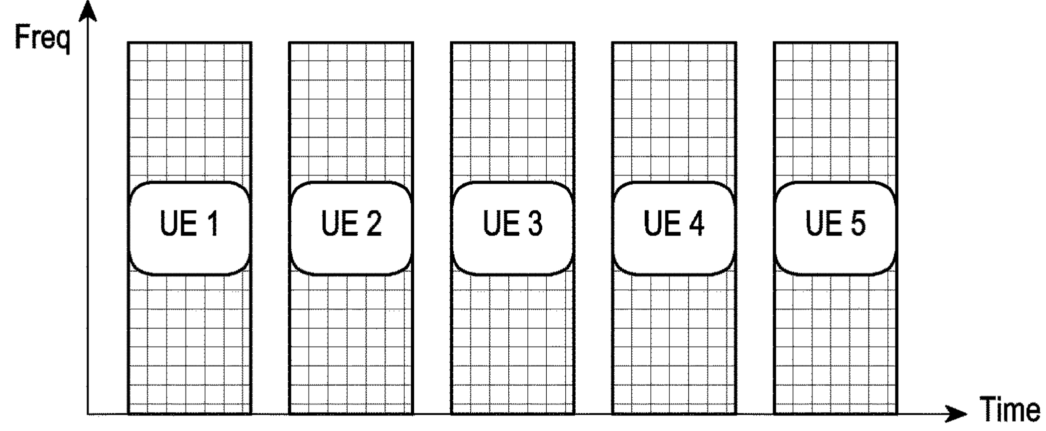
FIG. 9A and FIG. 9B illustrate the concept of sub-band scheduling for a UE, according to various embodiments.
Figure 9B:
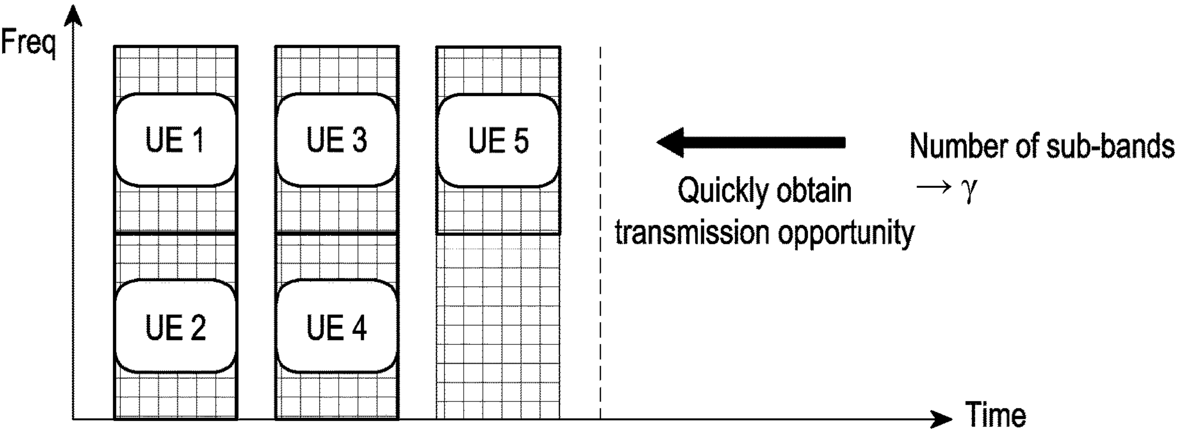

According to various embodiments, the scheduler 510 may allocate the resource, based on γ in operation 513 as shown in FIG. 9A and FIG. 9B. FIG. 9A and FIG. 9B illustrate the concept of sub-band scheduling for a UE according to various embodiments. For example, referring to FIG. 9A, when γ is 1, the scheduler 510 may allocate a resource to one UE for each Time to Interactive (TTI). When the scheduler 510 allocates a maximum number of RBs to one UE for all TTIs, a throughput may be limited and an average delay may be high. Referring to FIG. 9B, according to various embodiments, γ may be configured by the RL agent 103 and adjusted by the calibration module 320, thereby reducing the average delay. For example, as shown in FIG. 9B, it is possible to reduce the average delay and to quickly obtain a transmission opportunity by allocating resources to two or more UEs for each TTI. According to various embodiments, the RL agent 103 may configure γ in view of frequency selective fading, thereby improving an overall throughput. The number of UEs for each TTI may be configured to a minimum value among the configured γ and the number of UEs currently in an active state, but is not limited thereto.

Figure 6:
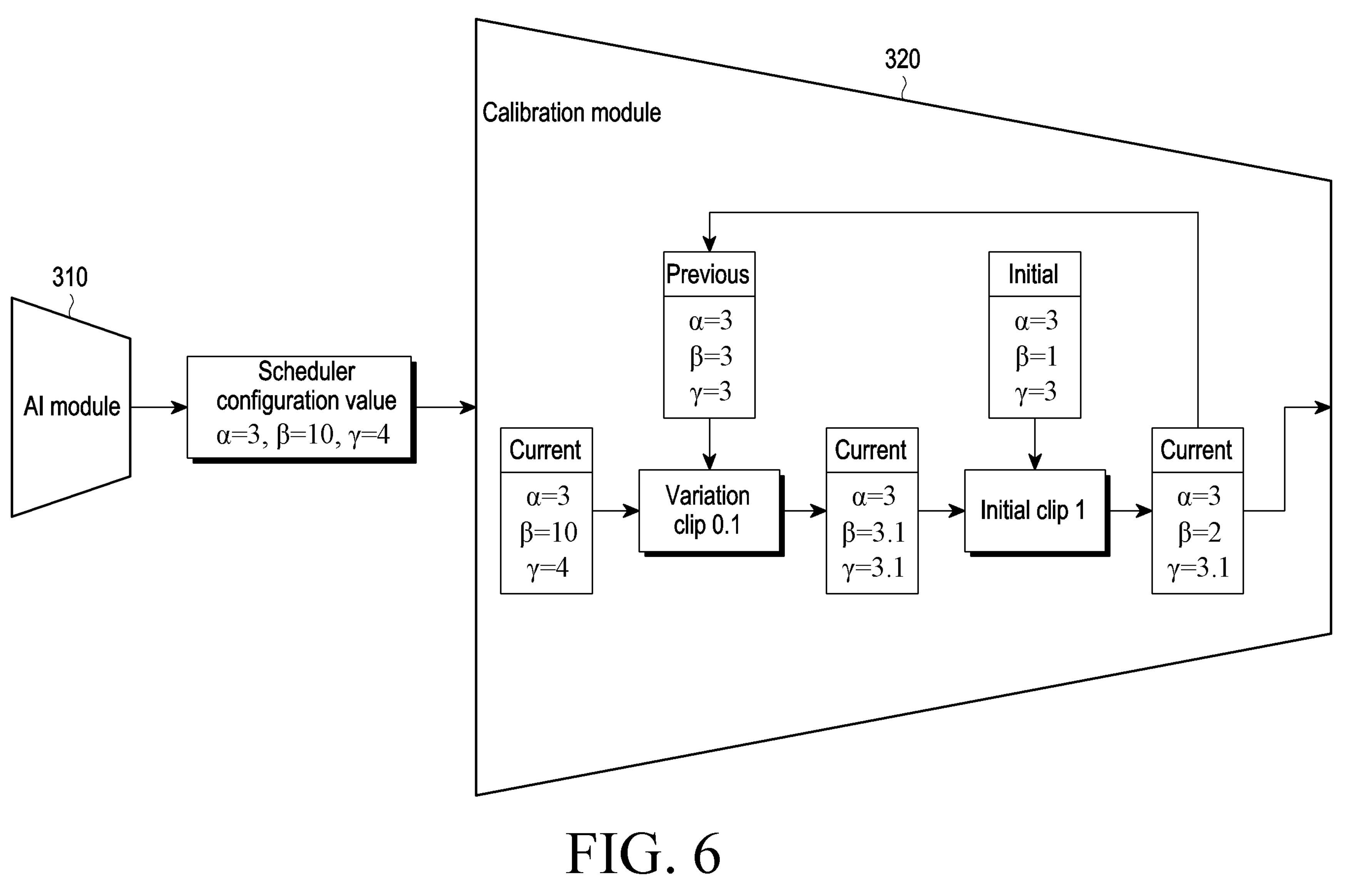
FIG. 6 illustrates an example of a learning process of a RIC, according to various embodiments.

FIG. 6 illustrates an example of a learning process of a RIC according to various embodiments. Referring to FIG. 6, an AI module 310 may output an action corresponding to at least one parameter as output. For example, the AI module 310 may output α, β, or γ described above as an action (e.g., a scheduler configuration value). For example, the AI module 310 may output 3 for α, 10 for β, and 4 for γ, based on current state information and reward information.

According to various embodiments, a calibration module 320 may adjust each configuration value currently output, based on a previous configuration value (e.g., a first threshold value). For example, when the difference from the previous configuration value is configured to be limited to 0.1, the calibration module 320 may limit the configuration value not to change by 0.1 or more from the previous configuration value. For example, assuming that α is 3, β is 3, and γ is 3 as previous configuration values, α may be maintained at 3, β may increase by 0.1 from 3 to be adjusted to 3.1, and γ may increase by 0.1 from 3 to be adjusted to 3.1. A change in the configuration value may be limited to a specific value, thereby preventing network performance from suddenly deteriorating due to a sudden change in the configuration value.

According to various embodiments, the calibration module 320 may adjust each configuration value currently output or first adjusted configuration value, based on an initial configuration value (e.g., a second threshold value). For example, when the difference from the initial configuration value is configured to be limited to 1, the calibration module 320 may limit the configuration value not to change by 1 or more from the initial configuration value. For example, assuming that α is 3, β is 1, and γ is 3 as initial configuration values, α may be maintained at 3, β may be adjusted to 2 by being adjusted from 3.1 to 2 or less, and γ may be maintained at 3.1 by being adjusted from 3.1 to 4 or less 3. The configuration value may be limited within a specific range from the initial configuration value, thereby preventing network performance from suddenly deteriorating as the configuration value deviates from a certain range.

Figure 7A:
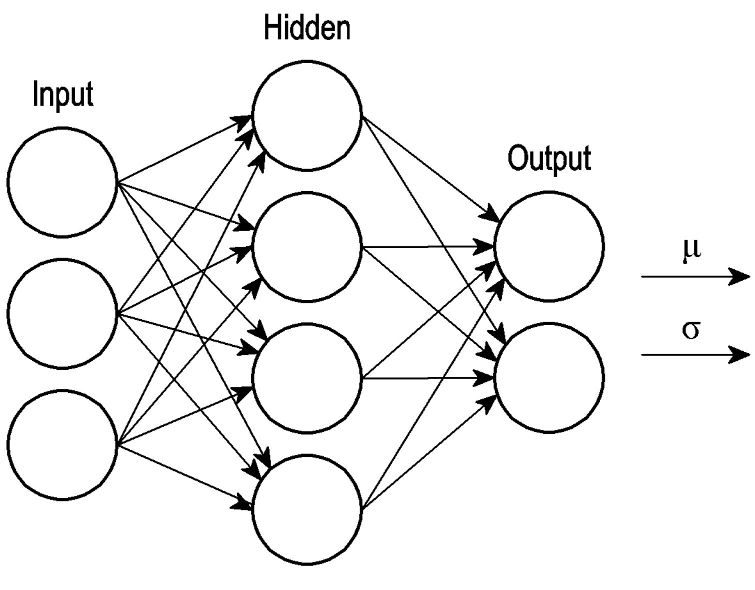
FIG. 7A and FIG. 7B illustrate the concept of a calibration method for a continuous variable, according to various embodiments.
Figure 7B:
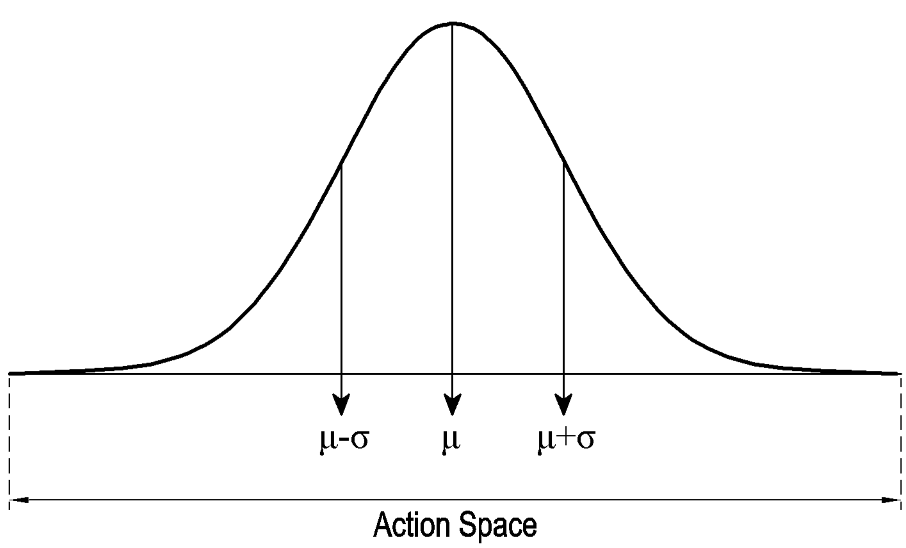

FIG. 7A and FIG. 7B illustrate the concept of a calibration method for a continuous variable according to various embodiments. Referring to FIG. 7A, to adjust a continuous action (configuration value), output of an AI module 310 may be configured as a stochastic variable. For example, as shown in FIG. 7A, the AI module 310 may configure two outputs of a mean and a standard deviation. For example, as shown in FIG. 7B, a stochastic distribution (e.g., a cumulative distribution function (CDF) and a probability density function (PDF)) may be generated with the mean and the standard deviation derived through the AI module 310. The AI module 310 may extract an action by performing random sampling based on the stochastic distribution. According to various embodiments, the action extracted by the AI module 310 may be adjusted by a calibration module 320.

Figure 8A:
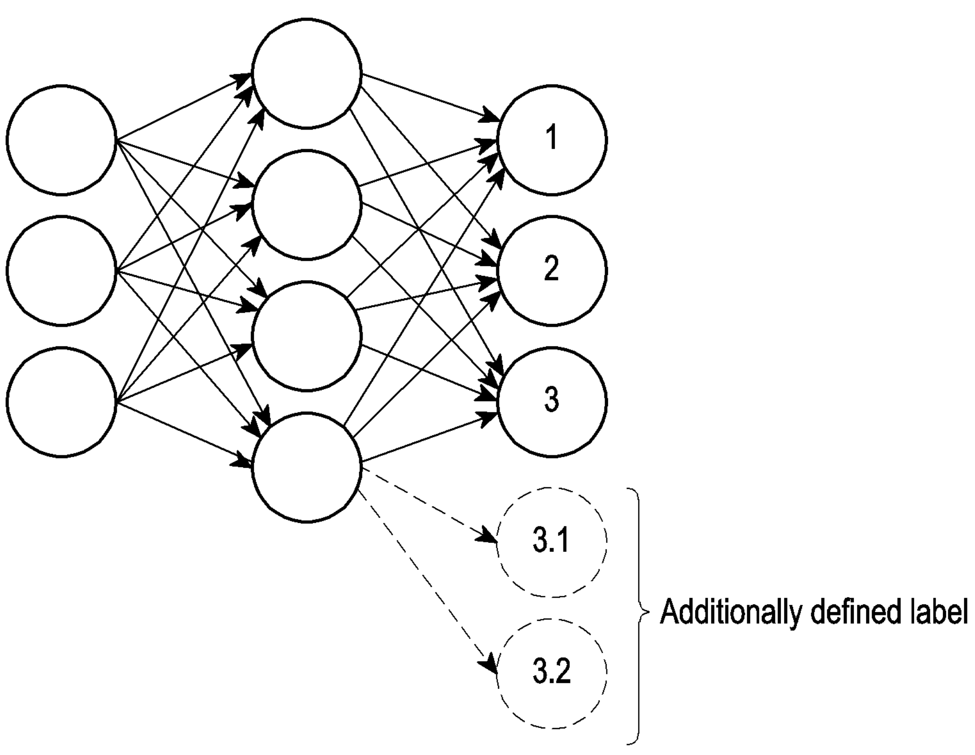
FIG. 8A and FIG. 8B illustrate the concept of a calibration method for a discrete variable, according to various embodiments.
Figure 8B:
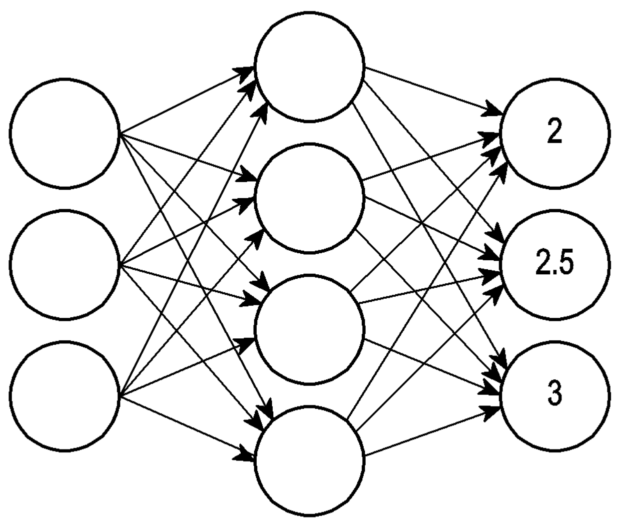

FIG. 8A and FIG. 8B illustrate the concept of a calibration method for a discrete variable according to various embodiments. Referring to FIG. 8A, to adjust a discrete action (configuration value), output of an AI module 310 may be configured as a deterministic variable. As shown in FIG. 8A, when an action (configuration value) obtained by a calibration module 320 adjusting the output of the AI module 310 is included in a previously defined label, the value may be used, and when the action (configuration value) obtained by adjustment by the calibration module 320 is not included in the previously defined label, a value closest to the previously defined label may be used as shown in FIG. 8B, or a label may be additionally defined as shown in FIG. 8A. For example, referring to FIG. 8A, when the previously defined labels are 1, 2, and 3 and output of the calibration module 320 is 3.1, 3.1 may be additionally defined as an output value of the AI module 310. Referring to FIG. 8B, when the previously defined labels are 2, 2.5, and 3, and the output of the calibration module 320 is 2.8, 3 which is the closest value to the previously defined labels may be selected.

Figure 10:
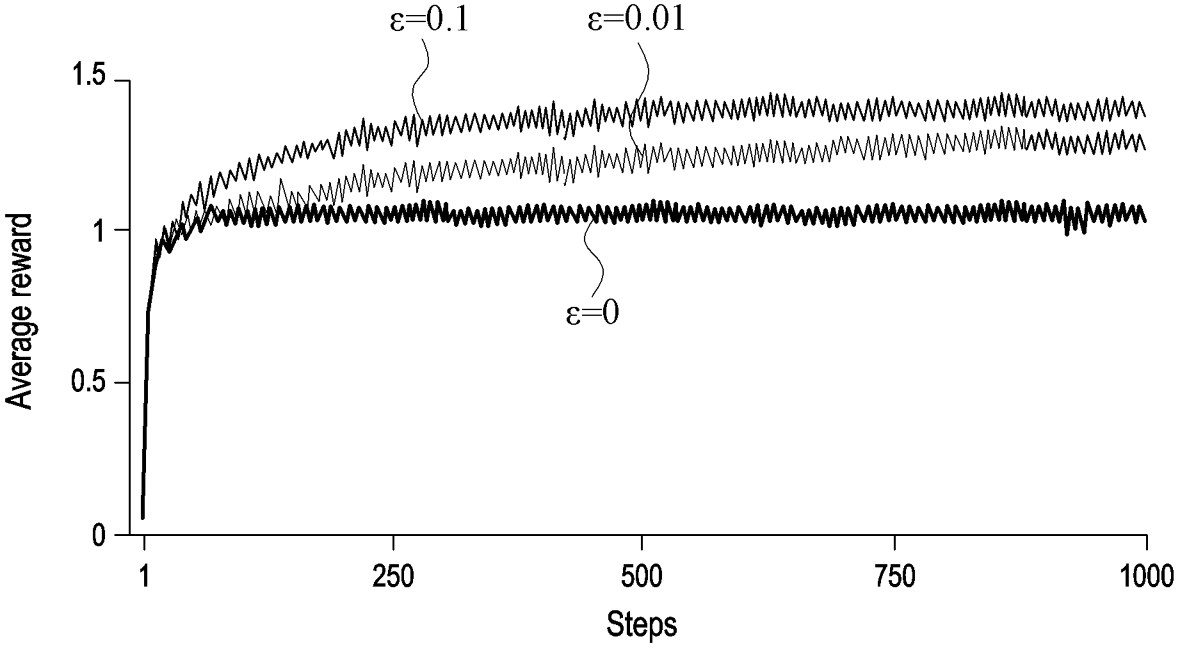
FIG. 10 is a graph illustrating a performance comparison between methods, according to various embodiments.

FIG. 10 is a graph illustrating a performance comparison between methods according to various embodiments. In the graph of FIG. 10, c denotes random noise, and may mean the probability value of a Bernoulli distribution. Referring to FIG. 10, an average reward value may increase as c increases. According to various embodiments, the result of the AI module 310 may be adjusted by a calibration module 320, thereby bringing an effect of imparting random noise. For example, various results may be derived by applying the calibration module 320 to the result of the AI module 310. As the various results are output, a learning module 330 may learn various experiences, thus increasing random noise, and accordingly the average reward value may increase.

Figure 11A:
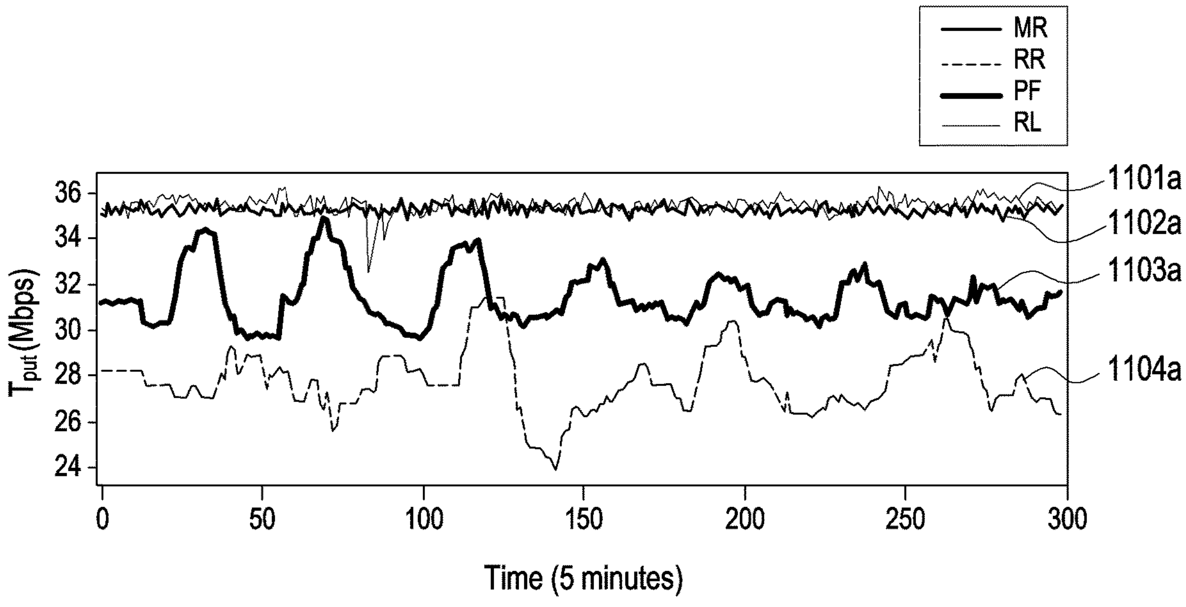
FIG. 11A and FIG. 11B are graphs illustrating a performance comparison between methods, according to various embodiments.
Figure 11B:
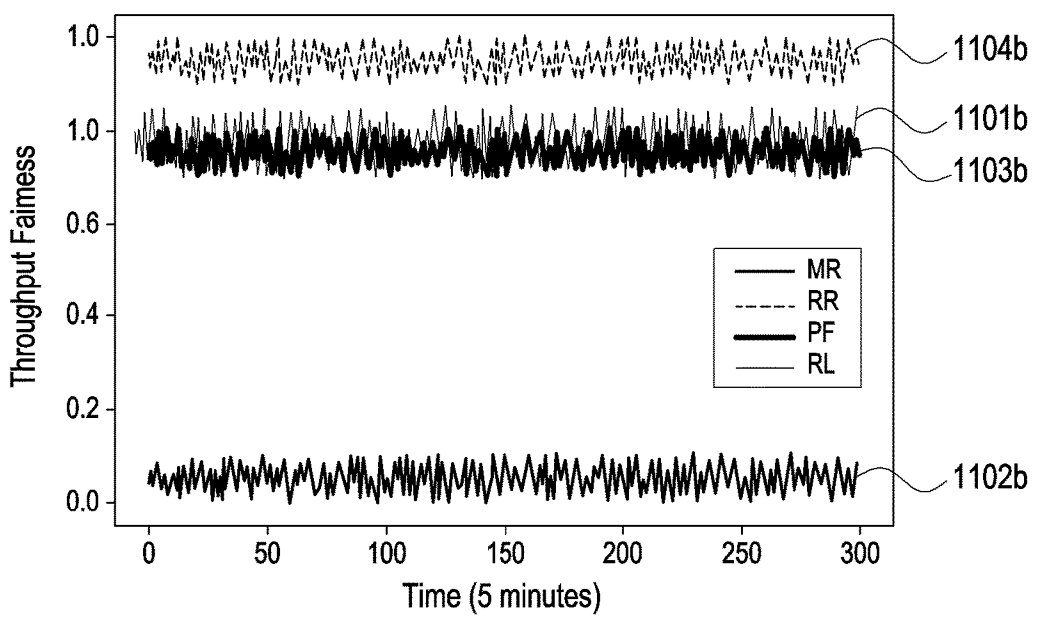

FIG. 11A and FIG. 11B are graphs illustrating a performance comparison between methods according to various embodiments. Referring to FIG. 11A, a throughput 1101*a* by PF scheduling with a parameter configured based on reinforcement learning (RL) may achieve similar performance to a throughput 1102*a* by max-rate (MR) scheduling, and may be relatively much higher than a throughput 1103*a* by general PF scheduling and a throughput 1104*a* by Round-Robin (RR) scheduling. Referring to FIG. 11B, throughput fairness 1101*b* by the PF scheduling with the parameter configured based on reinforcement learning (RL) may be similar to throughput fairness 1104*b* by the Round-Robin (RR) scheduling, and may be higher than throughput fairness 1103*a* by the general PF scheduling. In addition, the throughput fairness 1101*b* by the PF scheduling with the parameter configured based on reinforcement learning (RL) may be significantly higher than throughput fairness 1102*b* by the max-rate (MR) scheduling. For example, referring to both FIG. 11A and FIG. 11B, the PF scheduling with the parameter configured based on reinforcement learning (RL) may achieve relatively excellent results in both throughput and throughput fairness compared to the other scheduling methods. The max-rate (MR) scheduling is a scheduling method that may achieve a relatively high throughput but does not consider fairness, thus not guaranteeing fairness. However, according to various embodiments, the PF scheduling with the parameter configured based on reinforcement learning (RL) may adjust the value of a as described above, thereby ensuring fairness and achieving a relatively high throughput.

Figure 12:
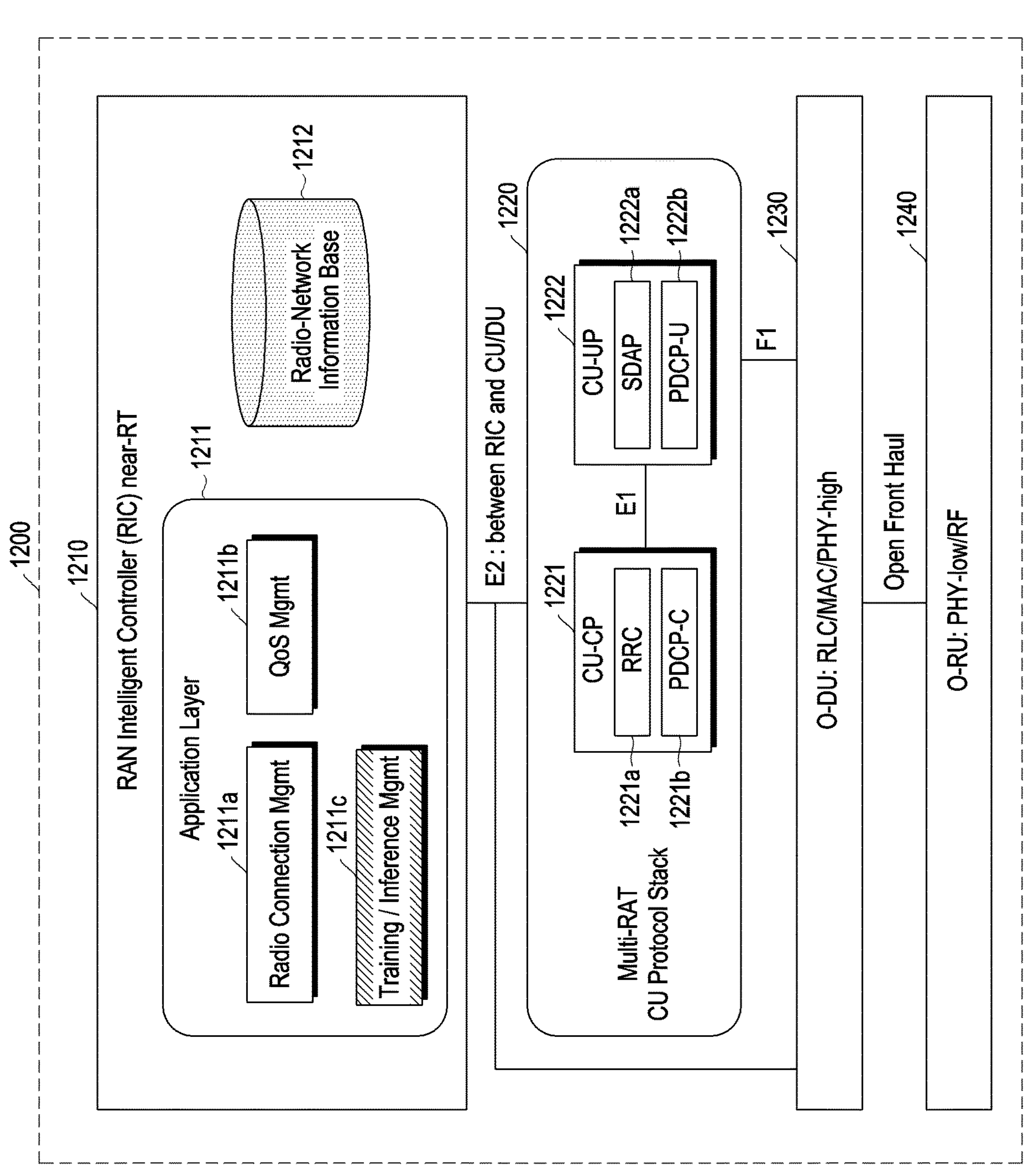
FIG. 12 illustrates an example of the configuration of a radio access network according to various embodiments.

FIG. 12 illustrates an example of the configuration of a radio access network according to various embodiments. Referring to FIG. 12, the RIC 101 and RAN 150 described above in FIG. 1A may be configured by an ORAN-RIC. According to various embodiments, a wireless communication system 1200 may include a RIC 1210 (e.g., a near real-time RIC (near-RT RIC)) and a RAN 150. The RIC 1210 may include an application layer 1211 and a database 1212. The application layer 1211 may include a 3rd party app (not shown), a radio connection manager 1211*a*, a QoS manager 1211*b*, and a training/inference manager 1211*c*. According to various embodiments, the foregoing AI module 310 may be configured in the form of the training/inference manager 1211*c* of the RIC 1210 in the ORAN-RIC structure. The database 1212 may include the database 102 of FIG. 2.

The RAN 150 may include a CU 1220, a DU 1230, and an RU 1240 as shown in FIG. 2. In the ORAN-RIC structure, an RU, a DU, a CU-CP, and a CU-UP may be defined as an O-RU 1240, an O-DU 1230, an O-CU-CP 1221, and an O-CU-UP 1222, respectively. The O-CU-CP 1221 may include an RRC entity 1221*a* and a PDCP-C entity 1221*b*, and the O-CU-UP 1222 may include an SDAP entity 1222*a* and a PDCP-U entity 1222*b*.

The RIC 1210 and the CU 1220 or the DU 1230 may be connected through an E2 interface. The CU 1220 and the DU 1230 may be connected through an F1 interface. The DU 1230 and the RU 1240 may communicate by wire or wirelessly through a transport network, and a path between the RU 1240 and the DU 1230 may be referred to as a front haul.

Figure 13:
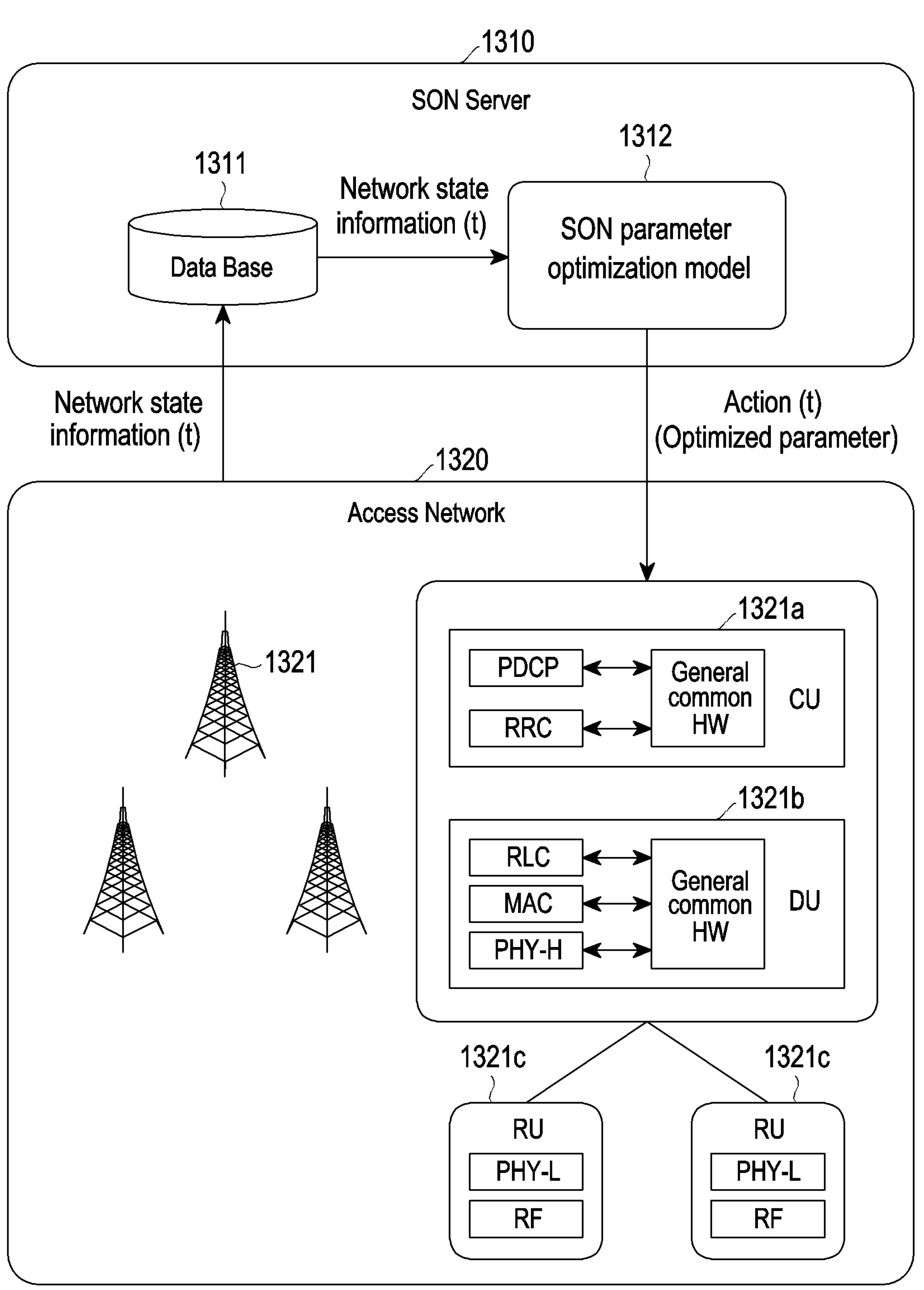
FIG. 13 illustrates an example of the configuration of a radio access network according to various embodiments.

FIG. 13 illustrates an example of the configuration of a radio access network according to various embodiments. Referring to FIG. 13, the RIC 101 and RAN 150 described above in FIG. 1A may be configured by a self-organizing network (SON). According to various embodiments, a wireless communication system may include a SON server 1310 and an access network 1320. The SON server 1310 may include a database 1311 and a SON parameter optimization model 1312. According to various embodiments, the foregoing AI module 310 may be configured in the form of the SON parameter optimization model 1312 of the SON server 1310. The database 1311 may include the database 102 of FIG. 2.

The access network 1320 may include a CU 1321*a*, a DU 1321*b*, and an RU 1321*c* as shown in FIG. 2. The CU 1321*a*, the DU 1321*b*, and the RU 1321*c* may correspond to a base station 1321.

Figure 14:
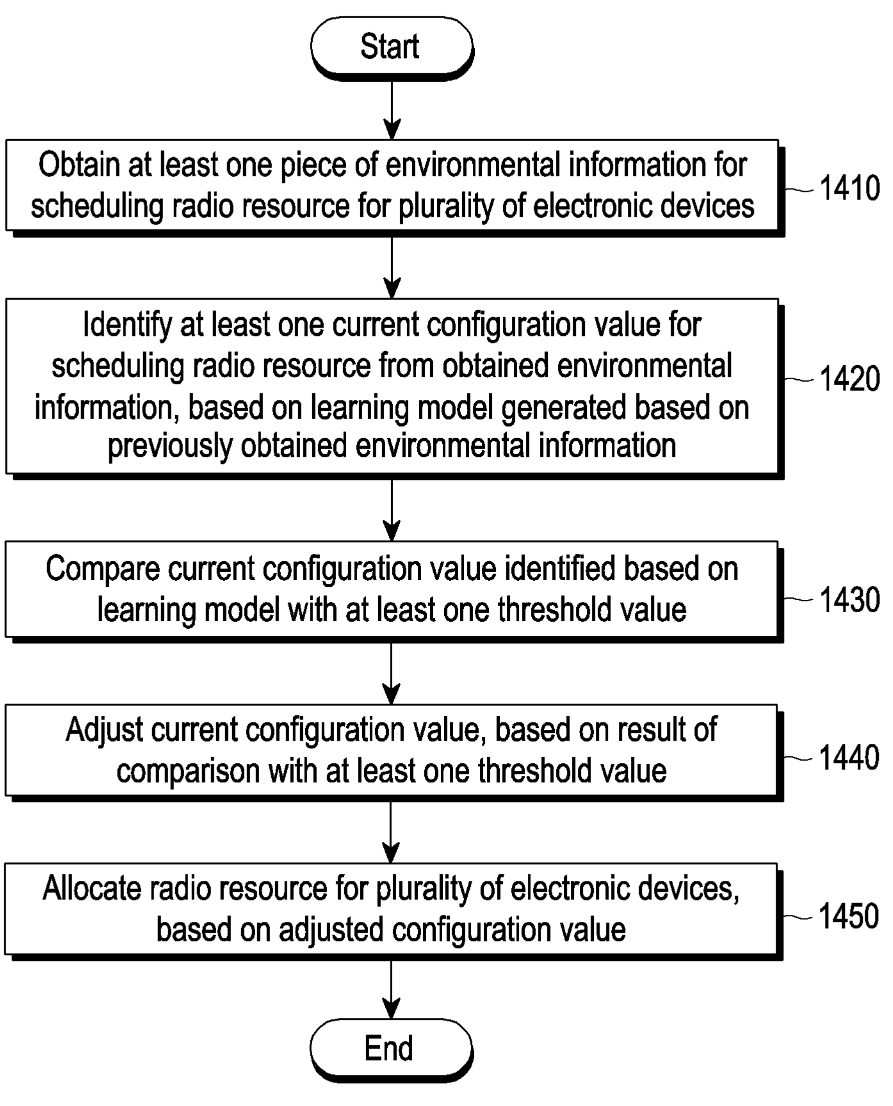
FIG. 14 is a flowchart illustrating an operating method of an electronic device, according to various embodiments.

FIG. 14 is a flowchart illustrating an operating method of an electronic device according to various embodiments. Referring to FIG. 14, according to various embodiments, the electronic device (e.g., a RIC 101) may receive at least one piece of environmental information for scheduling a radio resource for a plurality of electronic devices from a RAN 150 in operation 1410. The environmental information received from the RAN 150 may be stored in a database 102. For example, as described above, the environmental information may include state information or reward information for scheduling a radio resource. The state information for scheduling the radio resource may include at least one of a throughput for at least one UE connected to the RAN 150 or a modulation and coding scheme (MCS) for the at least one UE. The reward information received for scheduling the radio resource may include at least one of delay information about at least one UE connected to the RAN 150 or a cumulative transport block size (TBS) for the at least one UE.

According to various embodiments, the electronic device (e.g., an RL agent 103 of the RIC 101), in operation 1420, may identify at least one current configuration value for scheduling a radio resource from the received environmental information, based on a learning model (e.g., an RL model) generated based on previously received environmental information. According to various embodiments, the configuration value may be an operation (or action or RAN policy) of at least one entity, and the at least one entity of the RAN 150 may operate based on the received information.

According to various embodiments, the configuration value may include at least one configuration value for scheduling a radio resource. The at least one configuration value for scheduling the radio resource may include information related to radio resource allocation for a plurality of UEs connected to the RAN 150. The information related to the radio resource allocation may include information corresponding to at least one parameter for allocating, based on proportional fairness (PF), a radio resource. The at least one parameter for allocating, based on the PF, the radio resource may include at least one of a parameter corresponding to an increase in fairness, a parameter corresponding to an increase in throughput, or a parameter corresponding to the number of sub-bands allocable within a configured time period.

According to various embodiments, in operation 1430, the electronic device may compare the current configuration value identified based on the learning model with at least one threshold value. For example, the electronic device (e.g., a calibration module 320 of the RIC 101) may identify at least one first configuration value for scheduling the radio resource received, and may compare the first configuration value with the at least one threshold value. According to various embodiments, in operation 1440, the electronic device may adjust the current configuration value, based on the result of the comparison with the at least one threshold value.

For example, the electronic device may adjust the first configuration value to a second configuration value, based on the result of the comparison with the at least one threshold value, and may store the adjusted second configuration value in a database 102. According to various embodiments, the at least one threshold value may include a first threshold value corresponding to a previous configuration value (e.g., a previous action), and the second configuration value may be determined within a configured range from the first threshold value. For example, the electronic device (e.g., the calibration module 320) may limit a variance from the previous configuration value, based on the first threshold value. According to various embodiments, the at least one threshold value may include a second threshold value corresponding to an initial configuration value (e.g., an initially configured action), and the second configuration value may be determined within a configured range from the second threshold value. For example, the electronic device (e.g., the calibration module 320) may limit variance from the initial configuration value, based on the second threshold value. For example, as illustrated above in FIG. 6, the electronic device (e.g., the calibration module 320) may adjust the configuration value, based on the first threshold value or the second threshold value.

According to various embodiments, in operation 1450, the RAN 150 may allocate radio resources for the plurality of electronic devices, based on the adjusted configuration value.

Figure 15:
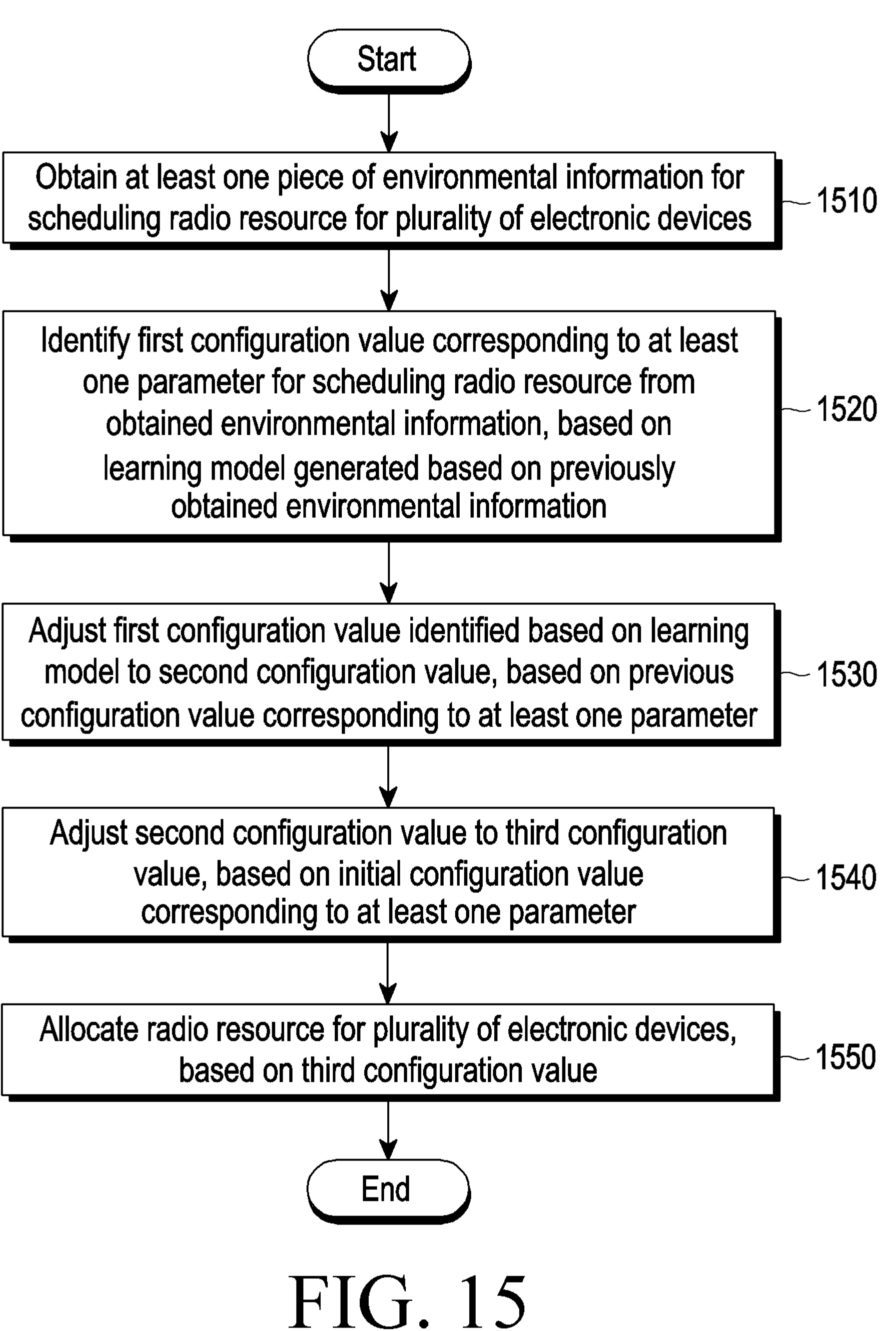
FIG. 15 is a flowchart illustrating an operating method of an electronic device, according to various embodiments.

FIG. 15 is a flowchart illustrating an operating method of an electronic device according to various embodiments. Referring to FIG. 15, according to various embodiments, the electronic device (e.g., a RIC 101) may receive at least one piece of environmental information for scheduling a radio resource for a plurality of electronic devices in operation 1510.

According to various embodiments, in operation 1520, the electronic device may identify a first configuration value corresponding to at least one parameter for scheduling a radio resource from the received environmental information, based on a learning model generated based on previously received environmental information.

According to various embodiments, as illustrated in FIG. 6, in operation 1530, the electronic device may adjust the first configuration value identified based on the learning model to a second configuration value, based on a previous configuration value corresponding to the at least one parameter.

According to various embodiments, as illustrated in FIG. 6, in operation 1540, the electronic device may adjust the second configuration value to a third configuration value, based on an initial configuration value corresponding to the at least one parameter.

According to various embodiments, in operation 1550, a RAN 150 may allocate radio resources for the plurality of electronic devices, based on the adjusted third configuration value.

An electronic device according to any one of various embodiments may include a storage device and at least one processor, wherein the at least one processor may obtain environmental information corresponding to each of at least one parameter associated with a radio access network (RAN) from the RAN to store the environmental information in the storage device, may identify at least one first configuration value for scheduling a radio resource from the obtained environmental information, based on a learning model generated based on previously obtained environmental information, may compare the first configuration value identified based on the learning model with at least one threshold value, may adjust the first configuration value to a second configuration value, based on a result of the comparison with the at least one threshold value, and may transmit the adjusted second configuration value to the RAN.

According to various embodiments, the environmental information may include at least one piece of state information.

According to various embodiments, the at least one piece of state information may include at least one of a throughput for at least one user equipment (UE) connected to the RAN or a modulation and coding scheme (MCS) for the at least one UE.

According to various embodiments, the environmental information may include at least one piece of reward information, and the at least one piece of reward information may include at least one of delay information about at least one UE connected to the RAN or a cumulative transport block size (TBS) for the at least one UE.

According to various embodiments, the at least one first configuration value for scheduling the radio resource may include information related to radio resource allocation for a plurality of UEs connected to the RAN.

According to various embodiments, the information related to the radio resource allocation may include information corresponding to at least one parameter for allocating a radio resource, based on proportional fairness (PF).

According to various embodiments, the at least one parameter for allocating the radio resource, based on the PF, may include at least one of a parameter corresponding to an increase in fairness, a parameter corresponding to an increase in throughput, or a parameter corresponding to a number of sub-bands allocable within a configured time period.

According to various embodiments, the learning model may include at least one of a reinforcement learning model, a supervised learning model, an unsupervised learning model, or a semi-supervised learning model.

According to various embodiments, the at least one threshold value may include a first threshold value corresponding to a previous configuration value, and the second configuration value may be determined within a configured range from the first threshold value.

According to various embodiments, the at least one threshold value may include a second threshold value corresponding to an initial configuration value, and the second configuration value may be determined within a configured range from the second threshold value.

According to various embodiments, the at least one processor may use the adjusted second configuration value as data of the learning model.

An electronic device according to any one of various embodiments may include a storage device and at least one processor configured to, wherein the at least one processor may obtain environmental information corresponding to each of at least one parameter associated with a radio access network (RAN) from the RAN, may identify at least one first configuration value for scheduling a radio resource from the obtained environmental information, based on a learning model generated based on previously obtained environmental information, may compare the first configuration value identified based on the learning model with at least one threshold value, may adjust the first configuration value to a second configuration value, based on a result of the comparison with the at least one threshold value, and may use the adjusted second configuration value as data of the learning model.

According to various embodiments, the at least one processor may transmit the identified first configuration value to the RAN.

According to various embodiments, the environmental information may include at least one piece of state information, and the at least one piece of state information may include at least one of a throughput for at least one user equipment (UE) connected to the RAN or a modulation and coding scheme (MCS) for the at least one UE.

According to various embodiments, the environmental information may include at least one piece of reward information, and the at least one piece of reward information may include at least one of delay information about at least one UE connected to the RAN or a cumulative transport block size (TBS) for the at least one UE.

According to various embodiments, the at least one first configuration value for scheduling the radio resource may include information related to radio resource allocation for a plurality of UEs connected to the RAN.

According to various embodiments, the learning model may include at least one of a reinforcement learning model, a supervised learning model, an unsupervised learning model, or a semi-supervised learning model.

An operating method of an electronic device for providing scheduling information by learning in a wireless communication system according to any one of various embodiments may include obtaining environmental information corresponding to each of at least one parameter associated with a radio access network (RAN) from the RAN, identifying at least one first configuration value for scheduling a radio resource from the obtained environmental information, based on a learning model generated based on previously obtained environmental information, comparing the first configuration value identified based on the learning model with at least one threshold value, adjusting the first configuration value to a second configuration value, based on a result of the comparison with the at least one threshold value, and using the adjusted second configuration value as data of the learning model.

According to various embodiments, the method may further include transmitting the identified first configuration value to the RAN.

According to various embodiments, the environmental information may include at least one piece of state information, and the at least one piece of state information may include at least one of a throughput for at least one user equipment (UE) connected to the RAN or a modulation and coding scheme (MCS) for the at least one UE.

According to various embodiments, the environmental information may include at least one piece of reward information, and the at least one piece of reward information may include at least one of delay information about at least one UE connected to the RAN or a cumulative transport block size (TBS) for the at least one UE.

According to various embodiments, the learning model may include at least one of a reinforcement learning model, a supervised learning model, an unsupervised learning model, or a semi-supervised learning model.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that α singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C”, may include any one of, or all possible combinations of the items enumerated together in a corresponding one of the phrases. As used herein, such terms as “1st” and “2nd”, or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic”, “logic block”, “part”, or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term “non-transitory” simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
- memory storing instructions and comprising a storage device; and
- at least one processor,
- wherein the instructions when executed by the at least one processor, cause the electronic device to:
  - obtain, from a radio access network (RAN), environmental information corresponding to each of at least one parameter associated with the RAN,
  - store the environmental information in the storage device,
  - identify at least one first configuration value for scheduling a radio resource from the obtained environmental information, based on a learning model generated based on previously obtained environmental information,
  - determine at least one threshold value based on at least one previously obtained value of the at least one first configuration value,
  - compare the at least one first configuration value with the at least one threshold value, respectively,
  - adjust, based on a result of the comparison of the at least one first configuration value with the at least one threshold value, the at least one first configuration value to at least one second configuration value, and
  - transmit the at least one second configuration value to the RAN.

2. The electronic device of claim 1, wherein the environmental information comprises state information, and
- wherein the state information comprises at least one of information indicating a throughput for at least one user equipment (UE) connected to the RAN or information indicating a modulation and coding scheme (MCS) for the at least one UE.

3. The electronic device of claim 1, wherein the environmental information comprises reward information, and
- wherein the reward information comprises at least one of delay information about at least one user equipment (UE) connected to the RAN or information indicating a cumulative transport block size (TBS) for the at least one UE.

4. The electronic device of claim 1, wherein the at least one first configuration value comprises information related to radio resource allocation for a plurality of user equipments (UEs) connected to the RAN.

5. The electronic device of claim 4, wherein the information related to the radio resource allocation comprises information corresponding to at least one parameter for allocating the radio resource, based on proportional fairness (PF).

6. The electronic device of claim 5, wherein the at least one parameter for allocating the radio resource, based on the PF, the radio resource comprises at least one of a parameter corresponding to an increase in fairness, a parameter corresponding to an increase in throughput, or a parameter corresponding to a number of sub-bands allocable within a configured time period.

7. The electronic device of claim 1, wherein the learning model comprises at least one of a reinforcement learning model, a supervised learning model, an unsupervised learning model, or a semi-supervised learning model.

8. The electronic device of claim 1,
- wherein the at least one second configuration value is determined within a configured range from the first threshold value.

9. The electronic device of claim 8, wherein the at least one threshold value comprises a second threshold value corresponding to an initial configuration value, and
- wherein the at least one second configuration value is determined within a configured range from the second threshold value.

10. The electronic device of claim 1, wherein the instructions when executed by the at least one processor, further cause the electronic device to use the at least one second configuration value as data of the learning model.

11. An electronic device comprising:
- memory storing instructions and comprising a storage device; and
- at least one processor,
- wherein the instructions when executed by the at least one processor, cause the electronic device to:
  - obtain, from a radio access network (RAN), environmental information corresponding to each of at least one parameter associated with the RAN,
  - identify at least one first configuration value for scheduling a radio resource from the obtained environmental information, based on a learning model generated based on previously obtained environmental information,
  - determine at least one threshold value based on at least one previously obtained value of the at least one first configuration value,
  - compare the at least one first configuration value with the at least one threshold value, respectively, adjust, based on a result of the comparison of the at least one first configuration value with the at least one threshold value, the at least one first configuration value to at least one second configuration value, store the at least one second configuration value in the storage device, and input, into the learning model, the at least one second configuration value as data of the learning model.

12. The electronic device of claim 11, wherein the instructions when executed by the at least one processor, further cause the electronic device to transmit, to the RAN, the at least one first configuration value.

13. The electronic device of claim 11, wherein the environmental information comprises state information, and wherein the state information comprises at least one of information indicating a throughput for at least one user equipment (UE) connected to the RAN or information indicating a modulation and coding scheme (MCS) for the at least one UE.

14. The electronic device of claim 11, wherein the environmental information comprises reward information, and wherein the reward information comprises at least one of delay information about at least one user equipment (UE) connected to the RAN or information indicating a cumulative transport block size (TBS) for the at least one UE.

15. The electronic device of claim 11, wherein the learning model comprises at least one of a reinforcement learning model, a supervised learning model, an unsupervised learning model, or a semi-supervised learning model.

16. A method of operating an electronic device for providing scheduling information by learning in a wireless communication system, the method comprising:

obtaining, from a radio access network (RAN), environmental information corresponding to each of at least one parameter associated with the RAN;

identifying at least one first configuration value for scheduling a radio resource from the obtained environmental information, based on a learning model generated based on previously obtained environmental information;

determining at least one threshold value based on at least one previously obtained value of the at least one first configuration value;

comparing the at least one first configuration value with the at least one threshold value, respectively;

adjusting, based on a result of the comparing of the at least one first configuration value with the at least one threshold value, the at least one first configuration value to at least one second configuration value; and inputting, into the learning model, the at least one second configuration value as data of the learning model.

17. The method of claim 16, further comprising:

transmitting the at least one first configuration value to the RAN.

18. The method of claim 16, wherein the environmental information comprises state information, and wherein the state information comprises at least one of information indicating a throughput for at least one user equipment (UE) connected to the RAN or information indicating a modulation and coding scheme (MCS) for the at least one UE.

19. The method of claim 16, wherein the environmental information comprises reward information, and wherein the reward information comprises at least one of delay information about at least one user equipment (UE) connected to the RAN or information indicating a cumulative transport block size (TBS) for the at least one UE.

20. The method of claim 16, wherein the learning model comprises at least one of a reinforcement learning model, a supervised learning model, an unsupervised learning model, or a semi-supervised learning model.

* * * * *